US012798168B2

(12) United States Patent
Schlabach

(10) Patent No.: US 12,798,168 B2
(45) Date of Patent: Nov. 17, 2026

(54) EXTRUSION ASSEMBLY AND METHOD OF MANUFACTURING EXTRUDED MATERIAL

(71) Applicant: Green Fox Plastics, LLC, Millersburg, OH (US)

(72) Inventor: Daniel Mark Schlabach, Berlin, OH (US)

(73) Assignee: Green Fox Plastics, LLC, Millersburg, OH (US)

( * ) Notice: Subject to any disclaimer, the term of this patent is extended or adjusted under 35 U.S.C. 154(b) by 26 days.

(21) Appl. No.: 18/409,949

(22) Filed: Jan. 11, 2024

(65) Prior Publication Data

US 2024/0227271 A1 Jul. 11, 2024

Related U.S. Application Data

(60) Provisional application No. 63/479,467, filed on Jan. 11, 2023.

(51) Int. Cl.

| | |
|---|---|
| ***B29C 48/17*** | (2019.01) |
| ***B29C 48/07*** | (2019.01) |
| ***B29C 48/285*** | (2019.01) |
| ***B29C 48/30*** | (2019.01) |
| ***B29C 48/49*** | (2019.01) |

(Continued)

(52) U.S. Cl.

CPC ............ *B29C 48/175* (2019.02); *B29C 48/07* (2019.02); *B29C 48/17* (2019.02); *B29C 48/297* (2019.02); *B29C 48/30* (2019.02); *B29C 48/49* (2019.02); *B29C 48/907* (2019.02); *B29C 48/92* (2019.02);

(Continued)

(58) Field of Classification Search

CPC ... B39C 48/13; B39C 48/147; B39C 48/1472; B39C 48/1474; B39C 48/17; B39C 48/175; B39C 48/885; B39C 48/90–908; B29D 11/00865; B29D 11/00894; B29K 2105/0032; B29K 2995/002; B29K 2995/0021; B29C 37/0025; B29C 48/17; B29C 48/175; B29C 48/16; B29C 48/20; B29C 48/2556; B29C 48/268;

(Continued)

(56) References Cited

U.S. PATENT DOCUMENTS

| | | | | |
|---|---|---|---|---|
| 2,803,041 A * | 8/1957 | Hill | B29C 48/08 425/132 | |
| 3,922,328 A * | 11/1975 | Johnson | B29C 48/919 425/141 | |

(Continued)

FOREIGN PATENT DOCUMENTS

| | | |
|---|---|---|
| GB | 1257051 | * 12/1971 |
| GB | 2313088 | * 11/1997 |
| WO | WO0012293 | * 3/2000 |

*Primary Examiner* — Jeffrey M Wollschlager
(74) *Attorney, Agent, or Firm* — Sand, Sebolt & Wernow Co., LPA

(57) ABSTRACT

A method of forming an extrusion bubble in an extruded material. The method includes steps of extruding the material from an extruder to at least one die, expanding a first portion of the material along the at least one die, expanding a second portion of the material along a calibrator, and forming a bubble in the material between the at least one die and the calibrator to impart a simulated woodgrain appearance into the material. The method may further include a step of defining an extrusion gap between the at least one die and the calibrator; wherein the bubble is formed inside of the extrusion gap.

20 Claims, 19 Drawing Sheets

(51) Int. Cl.
*B29C 48/90* (2019.01)
*B29C 48/92* (2019.01)
*B44F 9/02* (2006.01)

(52) U.S. Cl.
CPC ........ *B44F 9/02* (2013.01); *B29K 2995/0021* (2013.01)

(58) Field of Classification Search
CPC ..... B29C 48/30; B29C 48/301; B29C 48/302; B29C 48/304; B44F 9/02
USPC .......................................................... 428/151
See application file for complete search history.

(56) References Cited

U.S. PATENT DOCUMENTS 3,936,518 A * 2/1976 Soda ....................... B29C 44/22 264/177.17
5,998,006 A 12/1999 Bambara et al.
6,309,200 B1 * 10/2001 Teutsch ................... B29C 59/00 425/325
6,854,970 B2 2/2005 Keller et al.
10,525,613 B2 1/2020 Lemay et al.
11,660,782 B2 5/2023 Jalbert
2002/0192401 A1 12/2002 Matsumoto et al.
2003/0057591 A1 * 3/2003 Lee ....................... B29C 48/175 264/177.1
2005/0048180 A1 3/2005 Moore et al.
2006/0255496 A1 11/2006 Wells
2007/0141316 A1 6/2007 McGrath et al.
2008/0010924 A1 * 1/2008 Pietruczynik ......... B29C 48/001 52/309.1
2009/0035581 A1 2/2009 Sudano
2009/0326113 A1 12/2009 Fortuyn et al.
2011/0256348 A1 * 10/2011 Koivisto ............... B29C 48/875 264/40.6
2014/0113155 A1 * 4/2014 Kim ........................ B32B 27/20 428/537.1
2014/0167315 A1 * 6/2014 Walrath ................ B29C 48/304 425/465
2015/0017387 A1 * 1/2015 Park ...................... B29C 48/175 428/151
2015/0044434 A1 * 2/2015 Kotiadis ............... B29C 48/266 427/280
2017/0036405 A1 2/2017 Tsai
2020/0055225 A1 * 2/2020 Ledvina .................. B29C 48/25
2020/0070396 A1 3/2020 Stephens et al.

* cited by examiner

EXTRUSION ASSEMBLY AND METHOD OF MANUFACTURING EXTRUDED MATERIAL

REFERENCE TO RELATED APPLICATIONS

This application claims the benefit of U.S. Provisional Application Ser. No. 63/479,467, filed on Jan. 11, 2023; the disclosure of which is incorporated herein by reference.

TECHNICAL FIELD

The present disclosure relates generally to the field of extrusion molding, more particularly, in one example, methods and apparatus for extrusion molding of plastic lumber products.

BACKGROUND ART

Extrusion manufacturing, particularly plastic extrusion, is a high volume manufacturing process which can be used to create objects having a fixed cross sectional profile. Extrusion may be utilized with any material but is commonly utilized with polymers, plastics, and other composite materials to produce various goods. One plastics extrusion product that is increasing in popularity is that of plastic or composite lumber products, which may then be utilized in place of wood as a building material for any application including decking, flooring, paneling, furniture making, or any other application where wood may normally be utilized.

Large scale extrusion processes, particularly those used to create plastic or composite lumber products, can use raw plastic stock, including recycled plastic material, to create a continuous or semi-continuous extrusion that may be formed to take the shape of a board, or other similar profile products. Commonly, these processes utilize raw plastic in the form of small beads called nurdles, which may be fed from a hopper into the extruder where the nurdles may be melted and driven through a die utilizing a screw or other similar device to push to molten plastic material into the die to form the shape of the end product.

The die may have any shape or size and may include various profile and/or aesthetic components to impart a specific shape and/or profile to the end product. Where extrusion is utilized to create plastic lumber, the die may include features such as rounded corners or texture imparting components designed to give a more natural or wood-like feel to the end product. Alternatively, as desired, a texture, such as woodgrain texture, may be embossed or otherwise pressed into the extrusion product as the plastic cools.

While this may provide an aesthetically pleasing look and feel, consumers tend to desire a more realistic looking product, including products having the appearance of woodgrain and woodgrain textures that are more natural and better approximate the look and feel of real wood, while providing the durability and uniform consistency of plastic or composite lumber products.

Current processes to address the introduction of simulated woodgrain appearance into extruded plastic lumber include a process known as streaking, wherein colorants and/or colored pellets are introduced as concentrates at the beginning of the extrusion process. This may result in a homogenous mixture of the main polymer with the colorants producing streaks of concentrated color where the color concentrates are added. This produces a longitudinal streak effect that is typically limited to the surface of the board; however, this can impart an artificial look and is not typically uniform and does not reproduce the look and feel of a real woodgrain product as accurately as desired.

Other solutions may include complex layering and mixing of coextruded colored layers that, while providing an aesthetically pleasing appearance, increase the cost and difficulty of the manufacturing process.

Additionally, embossing textures and patterns into the extruded product, as mentioned above, can create a textured look and feel but does not address the coloration and/or woodgrain appearance that is currently considered desirable.

SUMMARY OF THE INVENTION

The present disclosure addresses these and other issues by providing a color injection system that may inject streaks of color concentrate into the extrusion process at non-random and controlled intervals and at various depths to create a more visually appealing and accurate simulation of woodgrain coloration into an extruded plastic lumber product while minimizing the need for coextruded layers and/or extrusion mixing in the manufacturing process.

In another aspect, an exemplary embodiment of the present disclosure may provide an extrusion color injection system comprising: an extruder; at least one die operable to shape material exiting the extruder; and at least one color injector operable to inject a colorant into the material exiting the extruder in a pre-defined pattern and amount to impart a simulated woodgrain appearance into the material.

In yet another aspect, an exemplary embodiment of the present disclosure may provide a method of injecting a colorant into an extruded material comprising: extruding material from an extruder to at least one die; shaping the material into a board via the at least one die; and injecting a colorant into the material with at least one color injector in a pre-defined pattern and amount to impart a simulated woodgrain appearance into the material.

In yet another aspect, an exemplary embodiment of the present disclosure may provide a method of injecting a colorant into an extruded material, comprising: extruding the material from an extruder to at least one die; shaping the material into a board via the at least one die; injecting the colorant into the material with at least one color injector in a pre-defined pattern; and forming a bubble in the material to impart a simulated woodgrain appearance into the material downstream of the at least one die.

This exemplary embodiment or another exemplary embodiment may further include steps of delivering the colorant to the at least one color injector via a continuous feed; and transferring the colorant from the at least one color injector into the material via a nozzle of the at least one color injector. This exemplary embodiment or another exemplary embodiment may further include that the step of injecting the colorant into the material further comprises: directing the material through an injection block downstream of the at least one die; and injecting the colorant into the material via the at least one color injector while the material passes through the injection block. This exemplary embodiment or another exemplary embodiment may further include steps of adjusting the at least one color injector to a first injection depth relative to the injection block; wherein the colorant is injected into the material at the first injection depth. This exemplary embodiment or another exemplary embodiment may further include steps of adjusting at least another color injector to a second injection depth relative to the injection block; wherein the colorant is injected into the material at the second injection depth that is different than the first injection depth of the colorant. This exemplary embodiment or another exemplary embodiment may further include that the step of shaping the material into the board further comprises: shaping the material into the board via the at least one die and the injector block. This exemplary embodiment or another exemplary embodiment may further include steps of directing the material into an extrusion gap defined between the injection block and a calibrator; forming the bubble of the material in the extrusion gap; and directing the material into the calibrator downstream of the injection block and the extrusion gap. This exemplary embodiment or another exemplary embodiment may further include that the step of extruding the material from the extruder to the at least one die further comprises: directing the material from an exit of the extruder to the at least one die via a feed throat operably connected therebetween. This exemplary embodiment or another exemplary embodiment may further include that the step of injecting the colorant into the material further comprises: injecting the colorant into the material via the at least one color injector while the material passes through the feed throat. This exemplary embodiment or another exemplary embodiment may further steps of adjusting the at least one color injector to a first injection height relative to the feed throat; wherein the colorant is injected into the material at the first injection height. This exemplary embodiment or another exemplary embodiment may further include a step of adjusting at least another color injector to a second injection height relative to the feed throat; wherein the colorant is injected into the material at the second injection height that is different than the first injection height of the colorant. This exemplary embodiment or another exemplary embodiment may further include steps of directing the material into an extrusion gap defined between the at least one die and the calibrator; forming the bubble of the material in the extrusion gap; and directing the material into the calibrator downstream of the at least one die and the extrusion gap. This exemplary embodiment or another exemplary embodiment may further include that the step of injecting the colorant into the material further comprises: injecting the colorant into the material via the at least one color injector while the material passes through a feed throat; and injecting a second colorant into the material via at least another color injector while the material passes through an injection block. This exemplary embodiment or another exemplary embodiment may further include steps of adjusting the at least one color injector to a first injection height relative to the feed throat, wherein the colorant is injected into the material at the first injection height; and adjusting the at least another color injector to a second injection height relative to the injection block; wherein the second colorant is injected into the material at the second injection height that is different than the first injection height of the colorant.

In yet another aspect, an exemplary embodiment of the present disclosure may provide an artificial wood plank, comprising: an extruded material having a first extruded surface and a second extruded surface; at least one colorant injected between the first extruded surface and the second extruded surface; and an extruded bubble defined in the extruded material as the extruded material is provided in a molten state; wherein the extruded bubble imparts a simulated woodgrain appearance into the extruded material with the at least one colorant.

This exemplary embodiment or another exemplary embodiment may further include that one or more of the colorants is simulated as linear woodgrain element injected between the first extruded surface and the second extruded surface. This exemplary embodiment or another exemplary embodiment may further include that one or more of the colorants is simulated as non-linear woodgrain between the first extruded surface and the second extruded surface. This exemplary embodiment or another exemplary embodiment may further include that one or more of the colorants is simulated as a woodgrain knot injected between the first extruded surface and the second extruded surface. This exemplary embodiment or another exemplary embodiment may further include a first colorant of the at least one colorant is injected at a first depth between the first extruded surface and the second extruded surface; and a second colorant of the at least one colorant is injected at a second depth between the first extruded surface and the second extruded surface that is different than the first depth. This exemplary embodiment or another exemplary embodiment may further include a first pigment of color applied to the extruded material; and a second pigment of color applied to the at least one colorant is different than the first pigment of color.

In yet another aspect, an exemplary embodiment of the present disclosure may provide an extrusion color injection system comprising: an extruder; at least one die operable to shape material exiting the extruder; at least one color injector operable to inject a colorant into the material exiting the extruder in a pre-defined pattern; a calibrator downstream of the at least one die; and an extrusion gap defined between the at least one die and the calibrator; wherein a bubble is formed in the material at the extrusion gap to impart a simulated appearance into the material with the colorant.

This exemplary embodiment or another exemplary embodiment may further include that the at least one color injector further comprises: a feed operable to deliver a continuous supply of colorant to the at least one color injector; and a nozzle operably engaged with the feed, wherein the nozzle is operable to transfer the colorant from the at least one color injector into the material exiting the extruder. This exemplary embodiment or another exemplary embodiment may further include that the at least one color injector further comprises: an engagement portion. This exemplary embodiment or another exemplary embodiment may further include an injection block downstream of the at least one die; wherein the extrusion gap is defined between the injection block and the calibrator. This exemplary embodiment or another exemplary embodiment may further include that the injection block further comprises: at least one injector insert hole defined therein and is operable to engage the engagement portion of the at least one color injector with the injection block. This exemplary embodiment or another exemplary embodiment may further include that the injection block further comprises: an injection block entry defined at a first end of the injection block; an injection block exit defined at a second end of the injection block opposite to the first end; and a passageway defined therein and is accessible at the at least one injector insert hole, the injection block entry, and the injection block exit. This exemplary embodiment or another exemplary embodiment may further include the injection block further comprises: a first side positioned between the first end and the second end; and a second side positioned between the first end and the second end and opposite to the first side; wherein the at least one injector insert hole is defined at one or both of the first side and the second side. This exemplary embodiment or another exemplary embodiment may further include that the calibrator further comprises: an exterior wall that is aligned with the top end of the injection block and the bottom end of the injection block to define the extrusion gap;

wherein the bubble formed in the material expands above the exterior wall, the top end, and the bottom end. This exemplary embodiment or another exemplary embodiment may further include that the injection block further comprises: an injection die in addition to the at least one die of the color injection system. This exemplary embodiment or another exemplary embodiment may further include a calibrator downstream of the injection block. This exemplary embodiment or another exemplary embodiment may further include a feed throat in operable connection with an exit of the extruder; wherein the feed throat is operable to guide the material exiting the extruder towards the at least one die. This exemplary embodiment or another exemplary embodiment may further include that the feed throat further comprises: at least one injector insert hole defined therein and operable to engage the engagement portion of the at least one color injector therein. This exemplary embodiment or another exemplary embodiment may further include that the calibrator further comprises: an exterior wall that is aligned with a top end of the at least one die and a bottom end of the at least one die to define the extrusion gap; wherein the bubble formed in the material expands above the exterior wall, the top end, and the bottom end. This exemplary embodiment or another exemplary embodiment may further include an injection block downstream of the at least one die and the feed throat, the injection block having at least another injector insert hole defined therein. This exemplary embodiment or another exemplary embodiment may further include at least another color injector having a second engagement portion that is operable to engage with the at least another injector insert hole and to inject the colorant into the material. This exemplary embodiment or another exemplary embodiment may further include that the extrusion gap is defined between the injection block and the calibrator and omitted from between the at least one die and the calibrator. This exemplary embodiment or another exemplary embodiment may further include that the at least one die further comprises: at least one injector insert hole defined therein and is operable to engage the engagement portion of the at least one color injector with the at least one die. This exemplary embodiment or another exemplary embodiment may further include a color feeder operably engaged with the feed of the at least one color injector and operable to feed colorant to the at least one color injector. This exemplary embodiment or another exemplary embodiment may further include a second extruder operably engaged with the feed of the at least one color injector and operable to feed colorant to the at least one color injector.

In yet another aspect, an exemplary embodiment of the present disclosure may provide an extrusion color injection system comprising: an extruder; at least one die operable to shape material exiting the extruder; at least one color injector operable to inject a colorant into the material exiting the extruder in a pre-defined pattern and amount to impart a simulated appearance into the material; at least one injector insert hole defined in a feed throat or an injection block and is operable to adjust an injection depth of the at least one color injector inside of the feed throat or the injection block; a calibrator downstream of the injection block; and an extrusion gap defined between the at least one die and the calibrator; wherein a bubble is formed in the material at the extrusion gap to impart a simulated appearance into the material with the colorant.

In yet another aspect, an exemplary embodiment of the present disclosure may provide an extrusion color injection system comprising: an extruder; at least one die operable to shape material exiting the extruder; at least one color injector operable to inject a colorant into the material exiting the extruder in a pre-defined pattern and amount to impart a simulated appearance into the material; and at least one injector insert hole defined in a feed throat or an injection block and is operable to adjust an injection depth of the at least one color injector inside of the feed throat or the injection block.

In yet another aspect, an exemplary embodiment of the present disclosure may provide a method of forming an extrusion bubble in an extruded material, comprising: extruding the material from an extruder to at least one die; expanding a first portion of the material along the at least one die; expanding a second portion of the material along a calibrator; and forming a bubble in the material between the at least one die and the calibrator to impart a simulated woodgrain appearance into the material.

This exemplary embodiment or another exemplary embodiment may further include a step of defining an extrusion gap between the at least one die and the calibrator; wherein the bubble is formed inside of the extrusion gap. This exemplary embodiment or another exemplary embodiment may further include that the extrusion gap is less than one inch when measured between the at least one die and the calibrator. This exemplary embodiment or another exemplary embodiment may further include a step of expanding the bubble of the material along an exit end of the at least one die and into the extrusion gap. This exemplary embodiment or another exemplary embodiment may further include a step of expanding the bubble of the material along an entry end of the calibrator and into the calibrator. This exemplary embodiment or another exemplary embodiment may further include steps of providing a top end of the at least one die that is above the exit end of the at least one die; providing an exterior wall of the calibrator of the calibrator that is spaced apart from the entry end of the calibrator; defining an imaginary first plane that is parallel with the top end of the at least one die and the exterior wall of the entry end; and intersecting the imaginary first plane by the bubble of the material. This exemplary embodiment or another exemplary embodiment may further include steps of providing a bottom end of the at least one die that is below the exit end of the at least one die and opposite to the top end of the at least one die; defining an imaginary second plane that is parallel with the bottom end of the at least one die and the exterior wall of the entry end; and intersecting the imaginary second plane by the bubble of the material.

In yet another aspect, an exemplary embodiment of the present disclosure may provide a method of forming an extrusion bubble in an extruded material, comprising: extruding the material from an extruder to at least one die; injecting a colorant into the material with at least one color injector in a pre-defined pattern; and expanding a first portion of the material along the at least one die; expanding a second portion of the material along a calibrator; and forming a bubble in the material between the at least one die and the calibrator to impart a simulated woodgrain appearance into the material.

This exemplary embodiment or another exemplary embodiment may further include a step of defining an extrusion gap between the at least one die and the calibrator; wherein the bubble is formed inside of the extrusion gap. This exemplary embodiment or another exemplary embodiment may further include that the extrusion gap is less than one inch when measured between the at least one die and the calibrator. This exemplary embodiment or another exemplary embodiment may further include a step of expanding the bubble of the material along an exit end of the at least one die and into the extrusion gap. This exemplary embodiment or another exemplary embodiment may further include a step of expanding the bubble of the material along an entry end of the calibrator and into the calibrator. This exemplary embodiment or another exemplary embodiment may further include steps of providing a top end of the at least one die that is above the exit end of the at least one die; providing an exterior wall of the calibrator of the calibrator that is spaced apart from the entry end of the calibrator; defining an imaginary first plane that is parallel with the top end of the at least one die and the exterior wall of the entry end; and intersecting the imaginary first plane by the bubble of the material. This exemplary embodiment or another exemplary embodiment may further include steps of providing a bottom end of the at least one die that is below the exit end of the at least one die and opposite to the top end of the at least one die; defining an imaginary second plane that is parallel with the bottom end of the at least one die and the exterior wall of the entry end; and intersecting the imaginary second plane by the bubble of the material. This exemplary embodiment or another exemplary embodiment may further include that the step of injecting the colorant into the material with the at least one color injector in the pre-defined pattern further comprises: connecting the at least one color injector with an injection block. This exemplary embodiment or another exemplary embodiment may further include steps of providing the injection block downstream of the at least one die; and providing the injection block upstream of the calibrator. This exemplary embodiment or another exemplary embodiment may further include a step of defining an extrusion gap between the injection block and the calibrator; wherein the bubble is formed inside of the extrusion gap defined between the injection block and the calibrator. This exemplary embodiment or another exemplary embodiment may further include a step of expanding the bubble of the material along an exit end of the injection block and into the extrusion gap. This exemplary embodiment or another exemplary embodiment may further include a step of expanding the bubble of the material along an entry end of the calibrator and into the calibrator. This exemplary embodiment or another exemplary embodiment may further include steps of providing a top end of the injection block that is above the exit end of the injection block; providing a bottom end of the injection block that is below the exit end of the injection block and opposite to the top end of the injection block; providing an exterior wall of the calibrator of the calibrator that is spaced apart from the entry end of the calibrator; defining an imaginary first plane that is parallel with the top end of the injection block and the exterior wall of the entry end; defining an imaginary second plane that is parallel with the bottom end of the injection block and the exterior wall of the entry end; and intersecting one or both of the imaginary first plane and the imaginary second plane by the bubble of the material.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
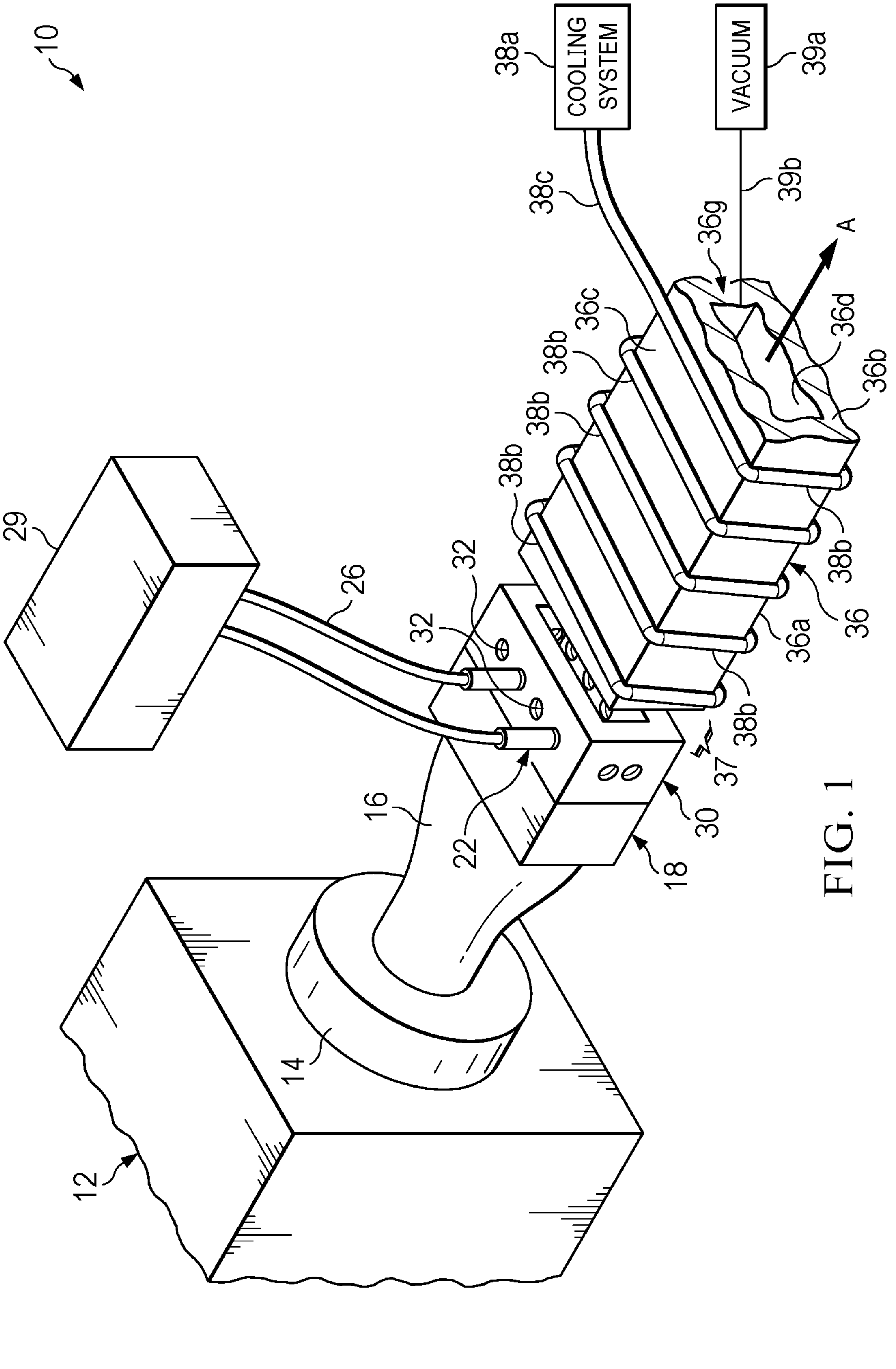
FIG. 1 is a side perspective view of a first embodiment of an extrusion color injection system in accordance to one aspect of the present disclosure.

With reference to FIGS. 1-7, an extrusion color injection system is shown and generally indicated at reference 10. At its most basic, extrusion color injection system 10 may include an extruder 12, one or more dies 18, an injection block 30, and a calibrator 36.

Figure 2:
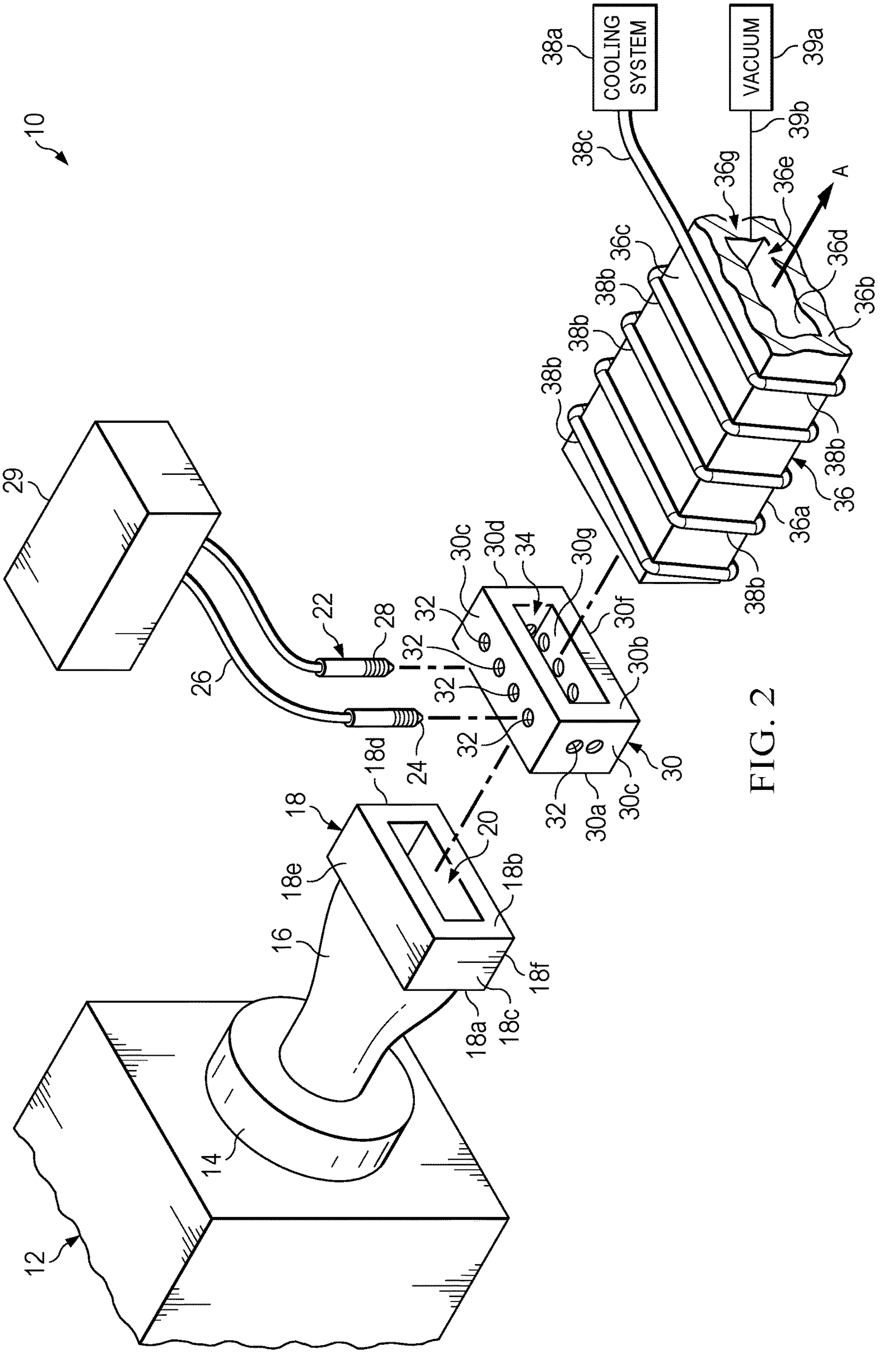
FIG. 2 is an exploded view of the first embodiment shown in FIG. 1.

Extruder 12 may be any suitable extruder or extruding system operable to move material such as molten plastic therethrough for normal extrusion type operations. Extruder 12 may further include an extruder exit 14, which may be the point at which molten material such as molten plastic may exit the extruder 12 and enter a feed throat 16, which may further direct material into the one or more dies 18, as discussed further below. In general, material may move through extrusion color injection system 10 in the direction of arrows A as shown in FIGS. 1 and 2.

Extruder 12, as contemplated herein, may be a screw-type extruder utilizing plastic nurdles, which may be new manufactured plastic, or may be recycled plastic material, which may be fed through the extruder 12 and into feed throat 16 as discussed further below.

Figure 4:
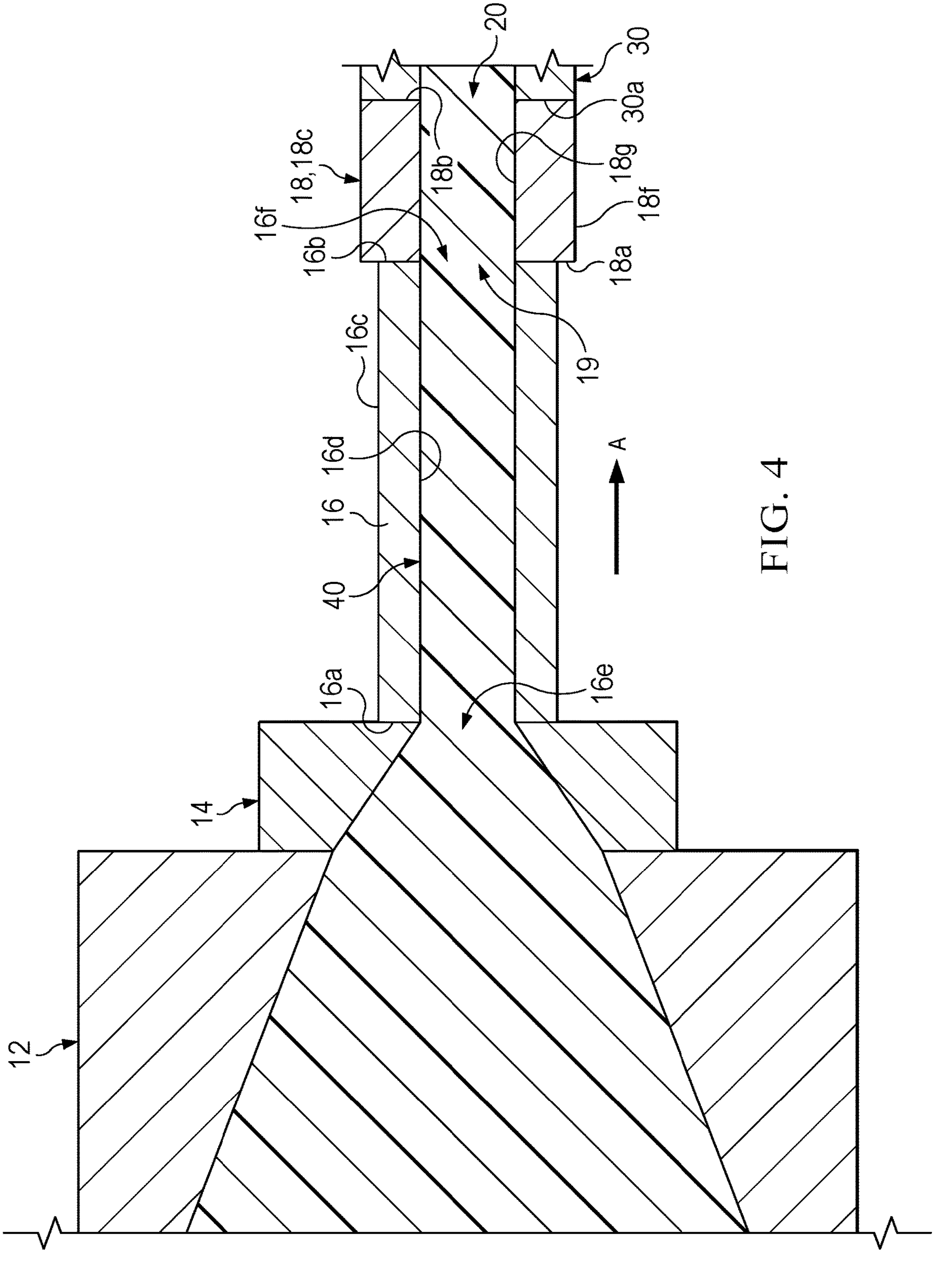
FIG. 4 is an operational view of the first embodiment, wherein material is being extruded from an extruder of the extrusion color injection system to a basic or first die of the extrusion color injection system for forming the material into an artificial wood board.

As best seen in FIG. 4, feed throat 16 includes a first end 16*a* that operably engages with the extruder 12, a second end 16*b* that is opposite to the first end 16*a* and spaced apart from the extruder 12, and a cylindrical wall 16*c* extending between the first end 16*a* and the second end 16*b*. Still referring to FIG. 4, the feed throat 16 also includes a passageway 16*d* that is defined by the cylindrical wall 16*c* and extends between the first end 16*a* and the second end 16*b*. The passageway 16*d* is also accessible at a feed throat inlet 16*e* defined at the first end 16*a* and at a feed throat outlet 16*f* defined at the second end 16*b*. As discussed in greater detail below, the passageway 16*d* may shape a molten material that is extruded by the extruder 12 at the extruder exit 14.

Feed throat 16 may generally be any suitable sized or shaped feed throat operable to direct molten material from the extruder exit 14 out of extruder 12 and onto die 18 as described further below. Feed throat 16 may generally direct molten material as well as shape, or begin to shape, the material as it enters into the die 18.

As best seen in FIG. 2, die 18 includes a first end 18*a* that operably engages with the feed throat 16, a second end 18*b* that is opposite to the first end 18*a* and spaced apart from the feed throat 16, and a first axis that extends between the first end 18*a* and the second end 18*b*. Still referring to FIG. 2, die 18 also includes a first side 18*c*, a second side 18*d* that opposite to the first side 18*c*, and a second axis that extends between the first side 18*c* and the second side 18*d*. Still referring to FIG. 2, die 18 also includes a top end 18*e*, a bottom end 18*f* opposite to the top end 18*e*, and a third axis that extends between the top end 18*e* and the bottom end 18*f*. Each of the first end 18*a*, the second end 18*b*, the first side 18*c*, the second side 18*d*, the top end 18*e*, and the bottom end 18*f* collectively defines a passageway 18*g* in die 18. In the present disclosure, the passageway 18*g* is accessible at a die entry 19 defined in the first end 18*a* and a die exit 20 defined in the second end 18*b*.

Die 18 may be sized and configured to shape molten material into any suitable configuration and/or cross section, including into rough board shape, as described further herein. Die 18 may be a standard die and formed of any suitable material and may further be interchangeable or otherwise removable from extrusion color injection system 10 and replaced with one or more other dies (not shown) as desired in order to change the size, shape, cross section, configuration, or other properties of the extruded material. As material moves through die 18, the material may exit the die 18 through die exit 20 before encountering injection block 30.

Injection block 30 may be, at its most basic, an additional die downstream of die(s) 18, and which may further serve to shape extrusion product as it passes from die(s) 18 through injection block 30. Injection block 30 may further include one or more color injectors 22 in operable connection therewith. Color injectors may be utilized, as discussed below, to inject a secondary color concentrate (referred to herein synonymously as a "colorant") into the molten material as it passes through injection block to create simulated grain patterns and/or grain lines on the surface and below the surface of the extrusion material.

As best seen in FIG. 2, injection block 30 includes a first end 30*a* that is downstream and in operative communication with die 18, a second end 30*b* opposite to the first end 30*a* and spaced apart from the die 18, and a first axis that extends between the first end 30*a* and the second end 30*b*. Still referring to FIG. 2, injection block 30 also includes a first side 30*c*, a second side 30*d* that opposite to the first side 30*c*, and a second axis that extends between the first side 30*c* and the second side 30*d*. Still referring to FIG. 2, injection block 30 also includes a top end 30*e*, a bottom end 30*f* opposite to the top end 30*e*, and a third axis that extends between the top end 30*e* and the bottom end 30*f*. Each of the first end 30*a*, the second end 30*b*, the first side 30*c*, the second side 30*d*, the top end 30*e*, and the bottom end 30*f* collectively defines a passageway 30*g* in injection block 30. In the present disclosure, the passageway 30*g* is accessible at a block entry 31 defined in the first end 30*a* and a block exit 34 defined in the second end 30*b*.

Still referring to injection block 30, injection block 30 also defines at least one injector insert hole 32. As best seen in FIG. 2, the injection block 30 defines a set of injector insert holes 32 in the first side 30*c* and the top end 30*e*. In the present disclosure, each injector insert hole of the set of injector insert holes 32 provides fluid communication between the passageway 30*g* and the external environment surrounding the injector block 30. As such, colorant, that is delivered to one or more injectors 22, may be injected into the passageway 30*g* at one or more of the injector insert holes of the set of injector insert holes 32 as the material travels through injection block 30; such injections of colorant into the material is discussed in greater detail below.

While the set of injector insert holes 32 is defined in the first side 30*c* and the top end 30*e*, any suitable number of injector insert holes may be defined in other ends or sides of the injection block 30 discussed herein. Examples of one or more injector insert holes 32 that may be further defined in the injection block 30 include the second side 30*d*, the bottom end 30*f*, and other ends or sides that may define an injection block for engaging with one or more injectors 22.

Color injectors 22 may further include a nozzle or tip 24, a colorant feed or injector feed 26, and an engagement portion 28, which may allow engagement with the injector insert holes 32 defined in injection block 30. Tip 24 may be the portion of the injectors 22 operable to interact with the extruded material to inject the colorant. Tip 24 may therefore include any suitable components necessary to effectuate the colorant injection, including, but not limited to, needles, blades, or any other suitable injection apparatus.

Colorant feed 26 may be any suitable feed system operable to deliver a continuous flow of color concentrate to the injectors 22, as dictated by the desired implementation. According to one example, colorant feed 26 may include pressurized hoses and the like to deliver a liquid colorant to the injectors 22. According to another example, feed 26 may be gravity fed utilizing a hopper or color feeder 29 (see FIG. 1) to contain the colorant above the level of the injectors 22 which may then travel through feed 26 or the like to reach the injectors 22. Other suitable arrangements and feed devices may be utilized as dictated by the desired implementation, provided that the feed 26 is continuous to provide colorant to the injectors 22 as needed in the extrusion and color injection process.

Injectors 22 may be any suitable device operable to inject a color concentrate into the molten material. It may further include any suitable device capable of carrying out the injection as desired. According to one aspect, injectors 22 may be pneumatically, hydraulically, or mechanically operated and may utilize liquid, semi-solid, or solid colorants, which may be injected in a predefined or semi-random pattern or amount as the molten material passes through injection block 30 according to the desired implementation. According to another aspect, injectors 22 may be independently controlled through the use of a processor and/or actuator system to allow for the desired pattern effect of colorant to be injected into the molten material as it move through injection block 30 as discussed further below.

Figure 3:
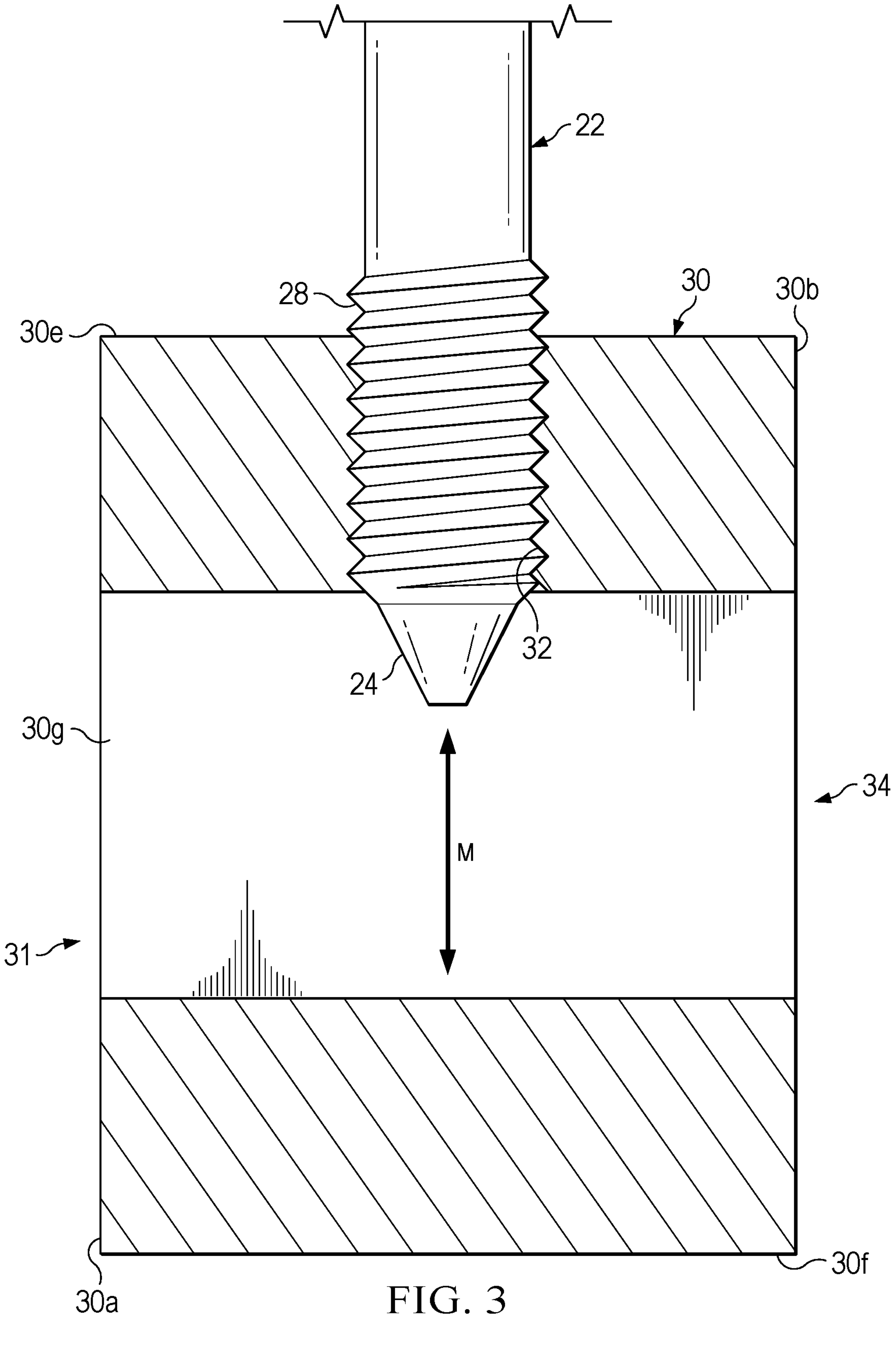
FIG. 3 is a cross-sectional view of an injection block and a color injector of the extrusion color injection system.

The engagement portions 28 of the injectors 22 may allow for injectors 22 to engage injection block 30 while further allowing for altered depth of color injections into the molten material as desired to create different and more pronounced visual dynamic effect in the end product; such adjustability and movement of each injector 22 is denoted by a double arrow labeled "M" in FIG. 3. In one example, the engagement portions 28 may be threads that threadably engage with the injector insert holes 32 where each injector insert hole 32 includes matching and/or corresponding threading. In other examples, engagement portions 28 and injector insert holes 32 may be any suitable components or elements that allow a user or operator of extrusion color injection system 10 to set a desired injection height for one or more injectors 22 relative to the injection block 30. Such adjustability of the injectors 22 with the injection block 30 is considered advantageous at least because the user or operator may vary the depth at which colorant is injected into the material for depicting various shades or intensities of artificial woodgrain.

The injected color material or colorants may be any suitable material capable of integrating with the base molten plastic as it moves through injection block 30. Some non-limiting examples may include plastic materials such as low density polyethylene (LDPE), high density polyethylene (HDPE), and/or polycarbonate and/or any suitable combination of materials. Each different material utilized in injectors 22 may result in a different texture and/or visual representation of grain pattern design in the end product as discussed further below.

Extrusion color injection system 10 may further include a calibrator 36, which may be a standard extrusion calibrator operable to receive the extruded material as it exits injection block 30 through injection block exit 34 and may further be any suitable calibrator type and configuration to properly calibrate the extrusion prior to cooling and further processing. According to one aspect, calibrator 36 may be a disc calibrator, a sleeve calibrator, or any other suitable calibrator type as dictated by the desired implementation and use thereof. Such features of calibrator 36 are discussed in greater detail below.

Figure 6:
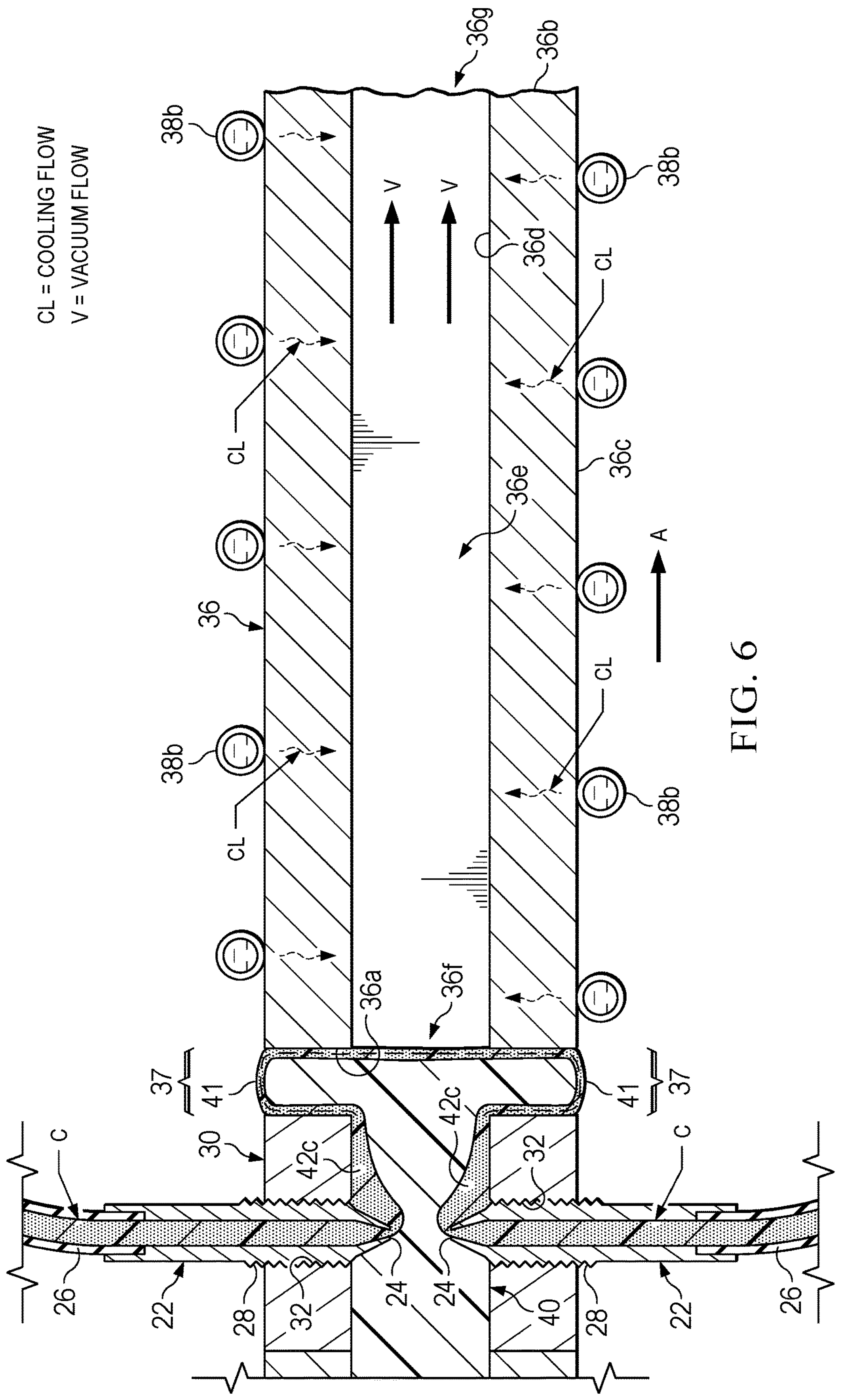
FIG. 6 is another operational view similar to FIG. 5, but the material is transferred from the injection block to a calibrator of the extrusion color injection system.

As best seen in FIG. 2, calibrator 36 includes a first end 36*a* that is downstream and faces the injection block exit 34, a second end 36*b* opposite to the first end 36*a* and spaced apart from the injection block 30, and a first axis that extends between the first end 36*a* and the second end 36*b*. Referring to FIGS. 2 and 6, the calibrator 36 also includes an outer wall 36*c* that extends between the first end 36*a* and the second end 36*b*, and an interior wall 36*d* that extends between the first end 36*a* and the second end 36*b* and is opposite to the outer wall 36*c*. Calibrator 36 also defines a passageway 36*e* (by the interior wall 36*d*) that extends between the first end 36*a* and the second end 36*b* (see FIGS. 2 and 6-7). The passageway 36*e* is also accessible at a calibrator entry 36*f* defined at the first end 36*a* and a calibrator exit 36*g* defined at the second end 36*b*.

Figure 7:
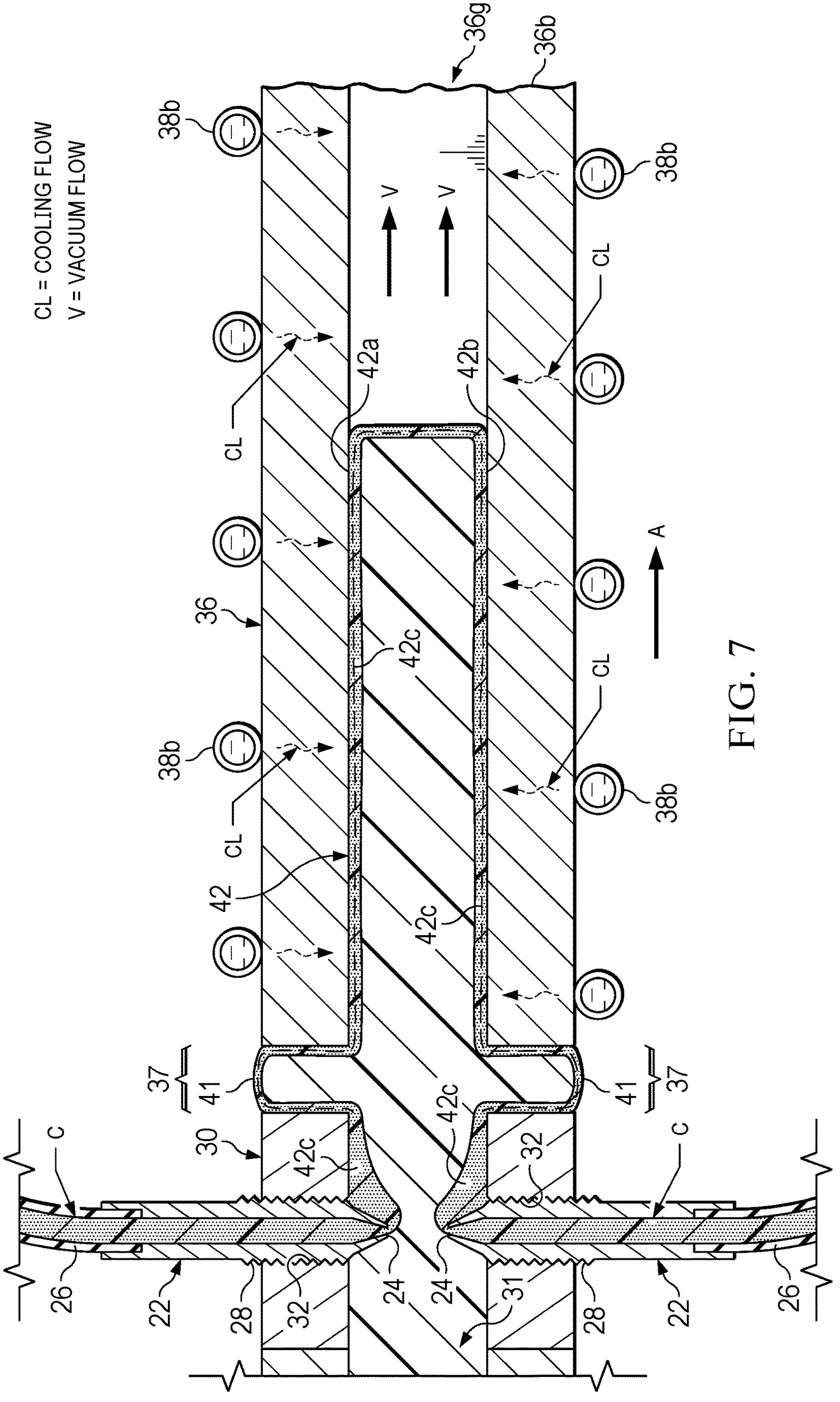
FIG. 7 is another operational view similar to FIG. 5 but is showing colorant being injected into the material by at least one color injector.

In the present disclosure, an extrusion gap or space generally referred to as 37 is defined between the injection block 30 and the calibrator 36. As best seen in FIGS. 6-7, the extrusion gap 37 is defined between the second end 30*b* of the injection block 30 and the first end 36*a* of the calibrator 36. Such structural separation between the injection block 30 and the calibrator 36 is considered advantageous at least because that extruded material being ejected from the injection block 30 creates a bubble or enlarged mass inside of the extrusion gap 37 to create patterns and/or designs in material once the material is formed into a desired objected (e.g., a wood plank or wood board).

It should be understood that a distance of the extrusion gap 37 defined between the injection block 30 and the calibrator 36 may be any suitable value that allows the extruded material to create a bubble or enlarged mass inside of the extrusion gap 37 for design purposes. In one exemplary embodiment, the extrusion gap 37 measured between the second end 30*b* of the injection block 30 and the first end 36*a* of the calibrator 36 is between one-half of an inch to about one inch. In another exemplary embodiment, the extrusion gap 37 measured between the second end 30*b* of the injection block 30 and the first end 36*a* of the calibrator 36 is between three-quarters of an inch to about one inch. In another exemplary embodiment, the extrusion gap 37 measured between the second end 30*b* of the injection block 30 and the first end 36*a* of the calibrator 36 is approximately three-quarters of an inch.

Extrusion color injection system 10 may also include a cooler system 38 that operably engages with the calibrator 36. As best seen in FIGS. 1-2 and 6-7, cooler system 38 includes a cooling machine 38*a* that feeds coolant and/or similar cooling material to a set of cooling members 38*b* that is operably engaged with the calibrator 36. Such coolant and/or cooling material is fed from the cooling machine 38*a* to the set of cooling members 38*b* via at least one cooling feed 38*c*. In the present disclosure, a single cooling feed 38*c* may provide operative communication between the cooling machine 38*a* and the set of cooling members 38*b*. In operation, the cooling system 38 may radiate and/or provide a cooling flow along the entire length of the calibrator 36 as molten material is passing through the calibrator 36. Such inclusion of the cooling system 38 with the calibrator 36 is considered advantageous at least because the cooling system 38 decreases the total time of hardening a material from a molten or liquid state to a solid state inside of the calibrator 36.

In the present disclosure, the set of cooling members 38*b* is diagrammatically shown with the calibrator 36 such that the set of cooling members 38*b* is externally wrapped about the calibrator 36 between the first and second ends 36*a*, 36*b* to decrease the total time of hardening a material from a molten or liquid state to a solid state inside of the calibrator 36. In other exemplary embodiments, other various types of cooling systems or cooling assemblies may be operable with the calibrator to decrease the total time of hardening a material from a molten or liquid state to a solid state inside of the calibrator 36. In one exemplary embodiment, a set of cooling members may be directly plumbed into a calibrator such that each cooling member of the set of cooling members is positioned inside of the calibrator. In another exemplary embodiment, a cooling system may be integrally formed with a calibrator such that the cooling system and the calibrator are a single, monolithic machine.

Extrusion color injection system 10 may also include a vacuum system 39 that operably engages with the calibrator 36. As best seen in FIGS. 1-2 and 6-7, vacuum system 39 includes a vacuum machine 39*a* that applies a vacuum or suction force inside of the calibrator 36 by at least one vacuum line 39*b*. In the present disclosure, the at least one vacuum line 39*b* is directly plumbed into the calibrator 36 such that a vacuum force is continuously applied inside of the passageway 36*e*, by the vacuum machine 39*a*, to linearly move material through the calibrator 36 from the first end 36*a* to the second end 36*b*.

In the present disclosure, the at least one vacuum line 39*b* is diagrammatically shown with the calibrator 36 such that at least one vacuum line 39*b* is directly plumbed with the calibrator 36 at or near the second end 36*b* to linearly move the material through the calibrator 36. In other exemplary embodiments, other various types of vacuum systems or vacuum assemblies may be operable with the calibrator to linearly move the material through the calibrator 36. In one exemplary embodiment, a plurality of vacuum lines may be directly plumbed into a calibrator at or near an exit of the calibrator to linearly move the material through the calibrator 36. In another exemplary embodiment, a vacuum system may be integrally formed with a calibrator such that the vacuum system and the calibrator are a single, monolithic machine.

Having thus described the elements and components of extrusion color injection system 10, the operation and use thereof will now be described in more detail.

In operation, extruder 12 extrudes a material (labeled 40 in FIGS. 4-7 and movement of the material is denoted by an arrow labeled "A" in FIGS. 4-6) that includes a first color, colorant, or color concentrates from the extruder exit 14 and into the feed throat 16 and the first die 18 (see FIG. 4). As the material 40 is exerted through the die 18, the die 18 may form the material 40 into a desired shape and/or configuration based on the shapes and/or configurations of the passageway 18*g*, die entry 19, and the die exit 20. In the present disclosure, the die 18 is sized and configured to help form the material 40 into a board by downstream components thereby simulating the material 40 into a wood board having woodgrain, which is discussed in greater detail below.

Figure 5:
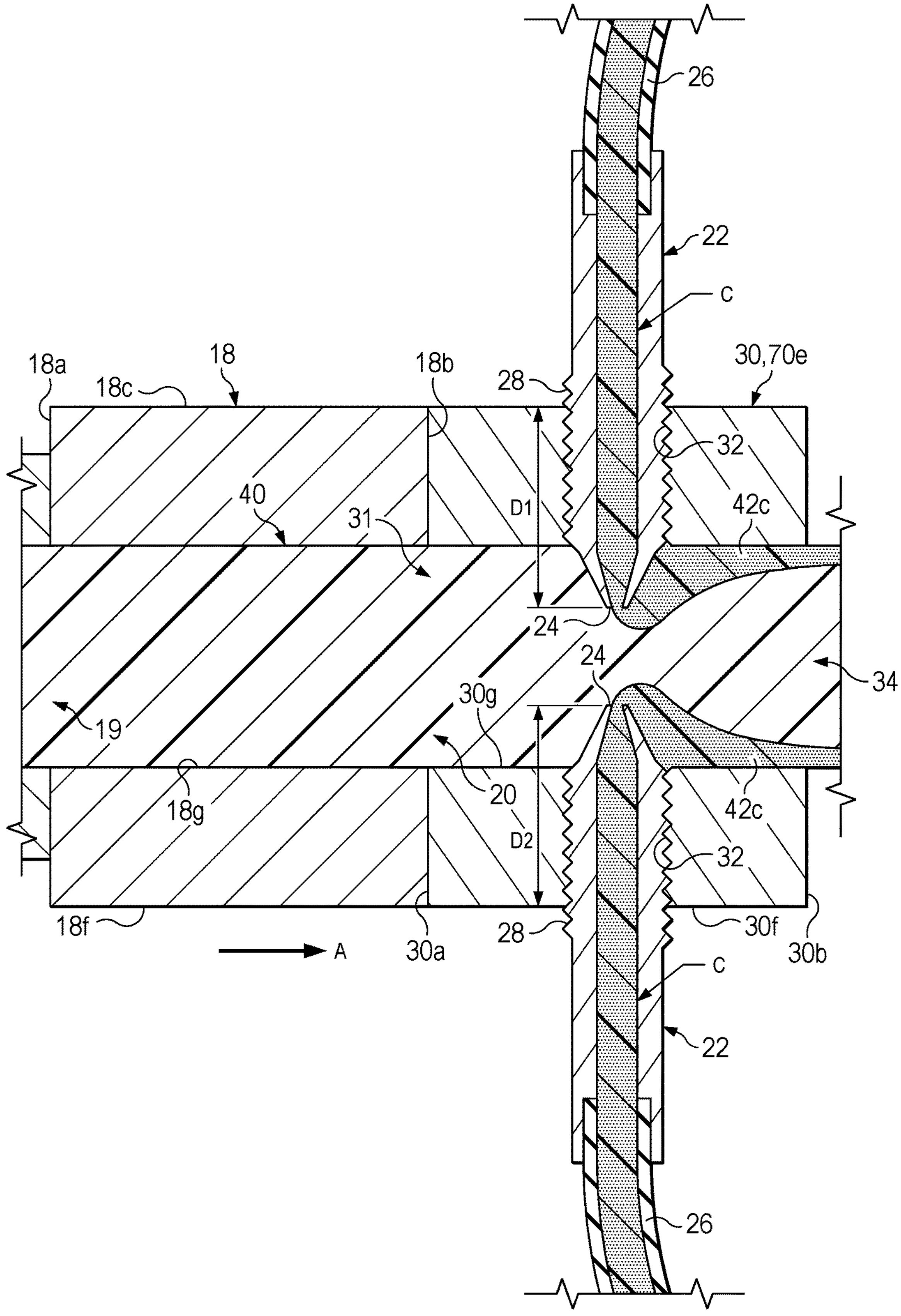
FIG. 5 is another operational view similar to FIG. 4, but the material is transferred from the basic die to an injection block of the extrusion color injection system to inject the material with a colorant by at least one injector of the extrusion color injection system.

As the material 40 is formed into an artificial wood board, the material 40 exits from the die 18, at the die exit 20, and enters into the injection block 30 at the injection block entry 31 (see FIG. 5). As the material 40 proceeds through the injection block 30, at least one injector 22 that is engaged with the injection block 30 at a respective injection insert hole 32 injects one or more colorants or color concentrates (labeled "C" in FIG. 7) into the material 40 while said material 40 is still molten. It should be understood that the colorant is injected at a predetermined depth into the material 40 based on the vertical placement of the injector 22 inside of the passageway 30*g*. In one example, a first injector of the set of injectors 22 may be set a first depth measured relative to the top end 30*e* of the injection block 30, and a second injector of the set of injectors 22 may be set a second depth measured relative to the top end 30*e* of the injection block 30 wherein the second depth is different than the first depth of the first injector of the set of injectors 22 (e.g., less than the first depth or greater than the first depth). As mentioned previously, such varying of depths at which colorant is injected into the material is preferred when intending to further enhance or increase the visual dynamics of the end product (e.g., varying shades or intensities of artificial woodgrain injected into the material 40).

It should be understood that during operation, the injectors 22 may also deliver a predetermined amount of shade, type, or a combination thereof of colorant material into the molten flow at predetermined or semi-random intervals injecting the secondary color behind or after the mixing screw of the extruder 12 but before the solidification of the extruded board may provide an aesthetically pleasing woodgrain appearance with surface colors increasing visual dynamics of the end product polymer board. As mentioned above, the colorants can be any suitable colorant or color concentrate including a plastic capable of integrating with the base plastic forming the body of the polymer board. For example, LDPE, HDPE, and/or polycarbonate may be utilized to enhance the texture and visual dynamics of the woodgrain appearance of the end product board.

In this particular embodiment, adding the injection block 30 and injectors 22 between the die 18 and calibrator 36 may cause the colorant to be injected directly into a partially shaped board. This location of the injection block 30 may result in the injected color manifesting as more linear streaks and grain lines because the board will undergo no additional physical manipulation before entering the calibrator 36. Thus, while the colorant will be drawn out as the molten material 40 moves through injection block 30, the lines produced by the injections will be mostly linear along the length of the extruded boards.

Once the material 40 has been injected with colorant by one or more injectors 22, the material 40 may then be transferred to the calibrator 36. Prior to being transferred to the calibrator 36, may ride along the second end 30*b* of the injection block 30 once the material 40 is pressed outside of the injection block 30 through the injection block exit 34 (see FIG. 6). At this stage of operation, the material 40 begins to balloon and/or expand inside of the extrusion gap 37 that is defined between the second end 30*b* of the injection block 30 and the first end 36*a* of the calibrator 36; such ballooning and/or expansion of the material 40 inside of the extrusion gap 37 may be referred to herein as an extrusion bubble generally labeled as 41 in FIGS. 6 and 7. Such extrusion bubble 41 of the material 40 may protrude and/or extend beyond an imaginary first plane that is defined along the top end 30*e* of the injection block 30 and the outer wall 36*d* of the calibrator 36 (see FIG. 6). Similarly, extrusion bubble 41 of the material 40 may also protrude and/or extend beyond an imaginary second plane that is defined along the bottom end 30*f* of the injection block 30 and the outer wall 36*d* of the calibrator 36 (see FIG. 6). In a preferred operation, the extrusion bubble 41 may slightly intersect with the imaginary first plane and the imaginary second plane due to a curvilinear and/or rounded profile when viewed from a side elevation or longitudinal sectional view (see FIGS. 6 and 7).

Such bubbling and/or expansion of the material 40 inside of the extrusion gap 37 is considered advantageous at least because such state forms and seals a pattern in the material 40. At this stage, the colorant that was injected into the material 40 may be further formed and sealed into the material 40 due to the expansion of said material 40; such expansion may assist in further defining grain-line features and/or appearances in the material to simulate the look and features of a wood board or wood plank. While not illustrated herein, a cover or shielding may be used at this stage to protect the molten material from encountering any elements or material that are floating in the environment that surrounds the injection block 30 and/or the calibrator 36.

As the extrusion bubble 41 forms inside of the extrusion gap 37, the extrusion bubble 41 then moves towards the calibrator 36 in which the extrusion bubble 41 contacts and the first end 36*a* of the calibrator 36. As best seen in FIG. 6, the extrusion bubble 41 rides along the first end 36*a* of the calibrator 36 and moves towards the calibrator entry 36*f*. Once the extrusion bubble 41 reaches the calibrator entry 36*f*, the extrusion bubble 41 breaches through the calibrator entry 36*f* and enters into the passageway 36*e* of the calibrator 36. As the material 40 enters into the passageway 36*e*, the material 40 may be also forced forwardly through the passageway 36*e* from the first end 36*a* to the second end 36*b* due to the vacuum force applied by vacuum system 39; such vacuuming force applied by the vacuum system 39 is denoted by arrows labeled "V" in FIGS. 6 and 7. As the material 40 passes through the calibrator 36 in the molten and/or liquid state, the material may also experience a cooling flow generated by the cooling system 38; such cooling flow generated by the cooling system 36 is denoted by arrows labeled "CL" in FIGS. 6 and 7. Upon experiencing this cooling flow, the material 40 hardens at an increased rate so as the material 40 passes through the calibrator 36.

As the material 40 passes through the calibrator 36, the calibrator 36 includes a desired calibrator type and configuration to properly calibrate the extrusion as the material 40 is cooling and further processing. According to one aspect, calibrator 36 is a board calibrator that forms the material 40 into a board configuration prior to the material 40 cooling and further processing. According to another aspect, calibrator 36 may be a disc calibrator, a sleeve calibrator, or any other suitable calibrator type as dictated by the desired implementation and use thereof.

Figure 8:
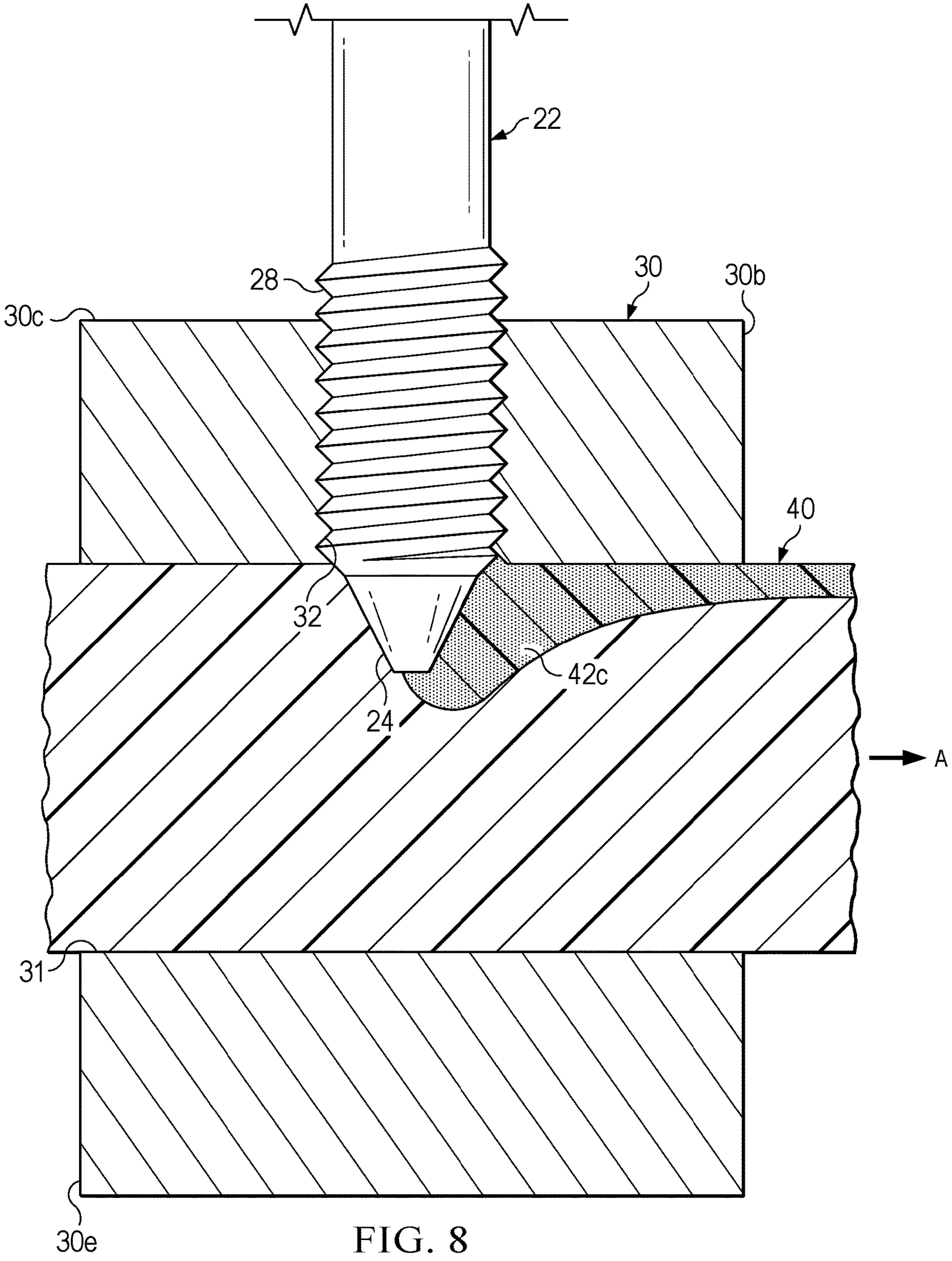
FIG. 8 is another operational view showing the material being formed into an artificial wood plank.
Figure 9:
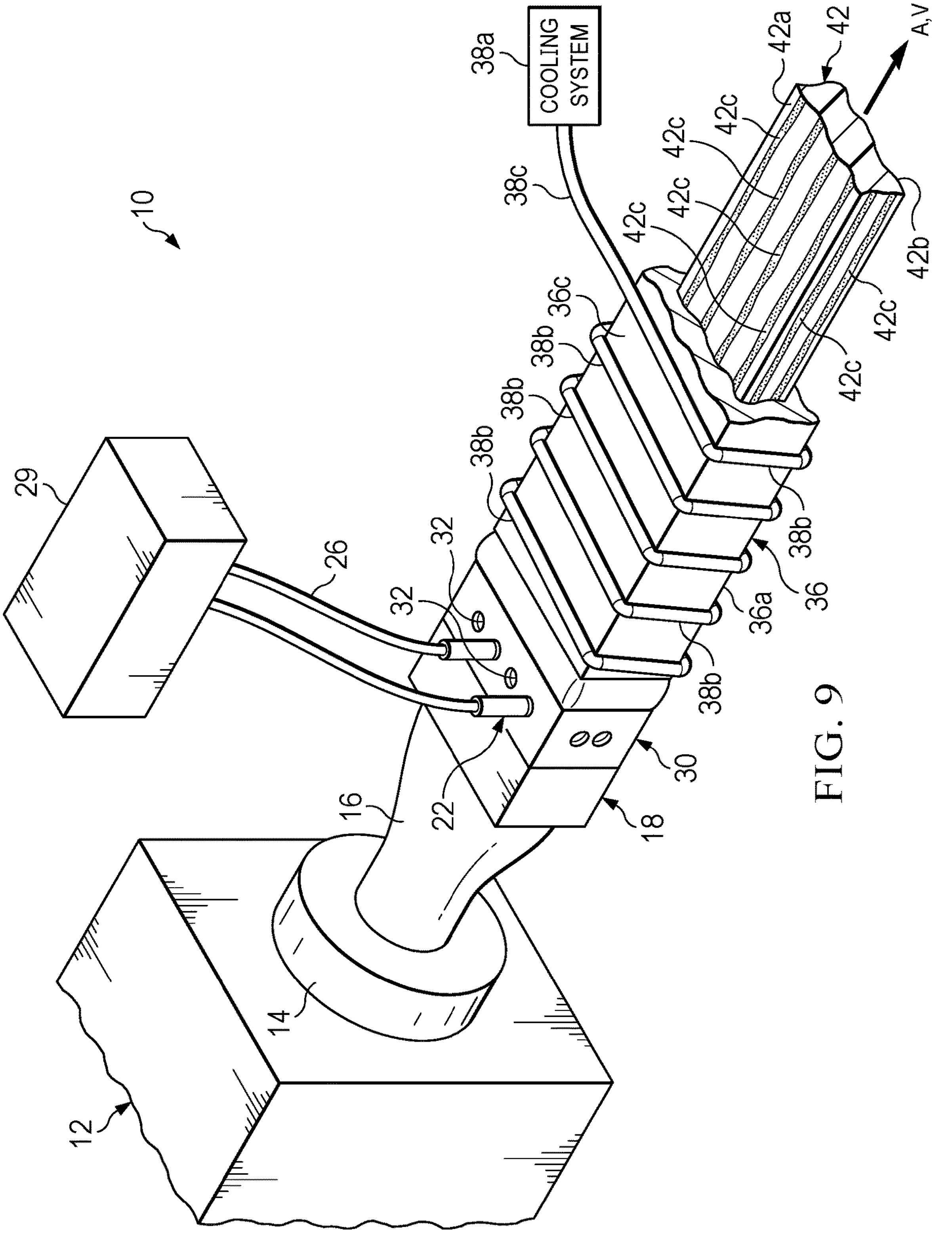
FIG. 9 is a side perspective view of a second embodiment of an extrusion color injection system in accordance to another aspect of the present disclosure.

Upon completion of the extrusion process as discussed above and illustrated in FIGS. 4-7, material 40 is formed as an artificial wood board 42. As best seen in FIG. 8, the artificial wood board 42 includes a first extruded surface 42*a*, a second extruded surface 42*b* that is opposite to the first extruded surface 42*a*, and a plurality of artificial woodgrain lines or elements 42*c* that is placed between the first extruded surface 42*a* and the second extruded surface 42*b* based on the depth at which one or more injectors 22 injected said colorant into the material 40. In one exemplary embodiment, each artificial woodgrain element of the plurality of artificial woodgrain elements 42*c* is placed at the same depth between the first extruded surface 42*a* and the second extruded surface 42*b*. In another exemplary embodiment, a first group of woodgrain elements of the plurality of woodgrain elements 42*c* is placed at a first depth between the first extruded surface 42*a* and the second extruded surface 42*b*, and a second group of woodgrain elements of the plurality of woodgrain elements 42*c* is placed at a second depth between the first extruded surface 42*a* and the second extruded surface 42*b* that is different from the first depth (e.g., less than the first depth or greater than the first depth).

FIGS. 9-15 illustrate another extrusion color injection system that is generally referenced as 110. The extrusion color injection system 110 is substantially similar to extrusion color injection system 10 discussed above and illustrated in FIGS. 1-7, except as detailed below.

Figure 10:
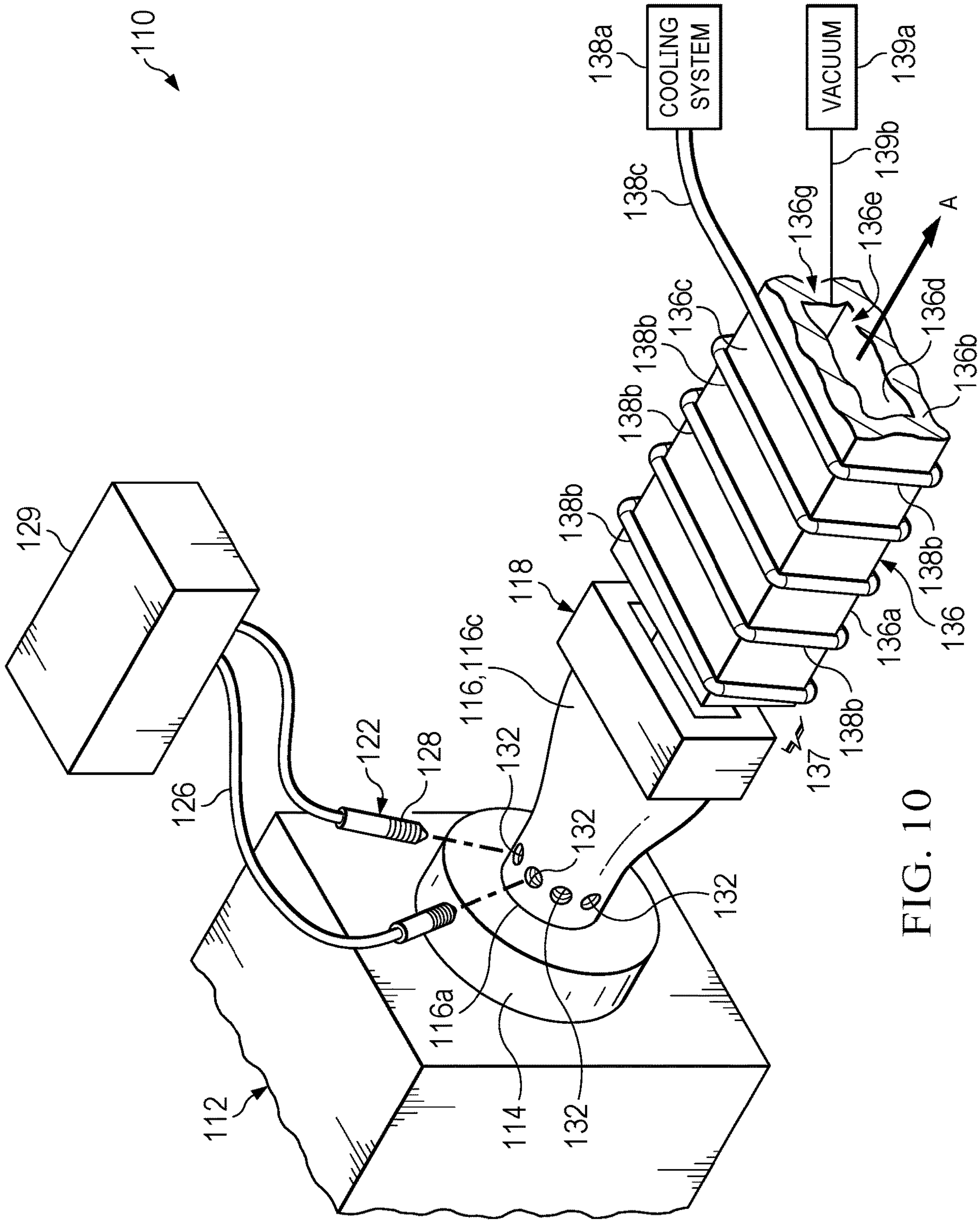
FIG. 10 is an exploded view of the second embodiment shown in FIG. 9.

With reference to FIG. 10, extrusion color injection system 110 includes extruder 112 having an extruder exit 114 that is substantially similar to the extruder 12 having the extruder exit 14 of the extrusion color injection system 10. The extrusion color injection system 110 also includes one or more dies 118 that has a first end 118*a*, a second end 118*b*, a first side 118*c*, a second side 118*d*, a top end 118*e*, a bottom end 118*f*, a passageway 118*g*, a die entry 119, and a die exit 120 which are substantially similar to one or more dies 18 that includes first end 18*a*, second end 18*b*, first side 18*c*, second side 18*d*, top end 18*e*, bottom end 18*f*, passageway 18*g*, die entry 19, and die exit 20 of the extrusion color injection system 110. The extrusion color injection system 110 also includes a calibrator 136 that has a first end 136*a*, a second end 136*b*, an exterior wall 136*c*, an interior wall 136*d*, a passageway 136*e*, a calibrator entry 136*f*, and a calibrator exit 136*g* that is substantially similar to first end 36*a*, second end 36*b*, exterior wall 36*c*, interior wall 36*d*, passageway 36*e*, calibrator entry 36*f*, and calibrator exit 36*g* of the calibrator 36 of the extrusion color injection system 10.

Extrusion color injection system 110 may further include one or more color injectors 122 having a nozzle or tip 124, injector feed 126 in operative communication with a hopper or color feeder 129, and an engagement portion 128 that are substantially similar to one or more color injectors 22 having nozzle or tip 24, injector feed 26 in operative communication with color feeder 29, and engagement portion 28 of the extrusion color injection system 10. Extrusion color injection system 110 may further include a cooling system 138 that includes a cooling machine 138*a*, a set of cooling members 138*b*, and a cooling feed 138*c* that is substantially similar to cooling system 38 that includes cooling machine 38*a*, set of cooling members 38*b*, and cooling feed 38*c* of the extrusion color injection system 10. Extrusion color injection system 110 may further include a vacuum system 139 that includes a vacuum machine 139*a* and at least one vacuum line 139*b* that are substantially similar to vacuum system 39 that includes vacuum machine 39*a* and at least one vacuum line 39*b* of extrusion color injection system 10.

In this embodiment, extrusion color injection system 110 differs from extrusion color injection system 10. As best seen in FIG. 10, extrusion color injection system 110 includes a feed throat 116 that is in operative communication with the extruder 112 at the extruder exit 114 similar to the feed throat 116. Particularly, feed throat 116 includes a first end 116*a*, a second end 116*b*, a cylindrical wall 116*c*, a passageway 116*d* defined between the first and second ends 116*a*, 116*b*, a feed throat inlet 116*e* defined at the first end 116*a*, and a feed throat inlet 116*f* defined at the second end 116*b* which are substantially similar to first end 16*a*, second end 16*b*, cylindrical wall 16*c*, passageway 16*d* defined between the first and second ends 16*a*, 16*b*, feed throat inlet 16*e* defined at the first end 16*a*, and feed throat inlet 16*f* defined at the second end 16*b* of feed throat 16. However, feed throat 116 defines injector insert holes 132 in the cylindrical wall 116*c* that provide operative communication into a passageway defined in feed throat 116. Similar to the injector insert holes 32 mentioned above, the injector insert holes 132 defined in the feed throat 116 enables one or more injectors 122 to operably engage with the feed throat 116 to deliver and inject colorant into material being extruded through the extrusion color injection system 110. It should be understood that such features of feed throat 116 may also apply to other feed throats discussed and illustrated herein, include feed throat 16.

In operation, the implication of the injectors 122 being operably engaged with the feed throat 116 is that the injectors 122 may inject a colorant or colorant material into the molten extrusion material as it passes through the feed throat 116 prior to encountering die 118, rather than injecting the colorant after the material exits the die 118 as with extrusion color injection system 10. As discussed in further detail below, injecting colorant material earlier in the process, by one or more injectors 122, may result in more random curls and folds in the colorant application resulting in a slightly more random and altered woodgrain pattern appearance, as discussed further below.

Figure 12:
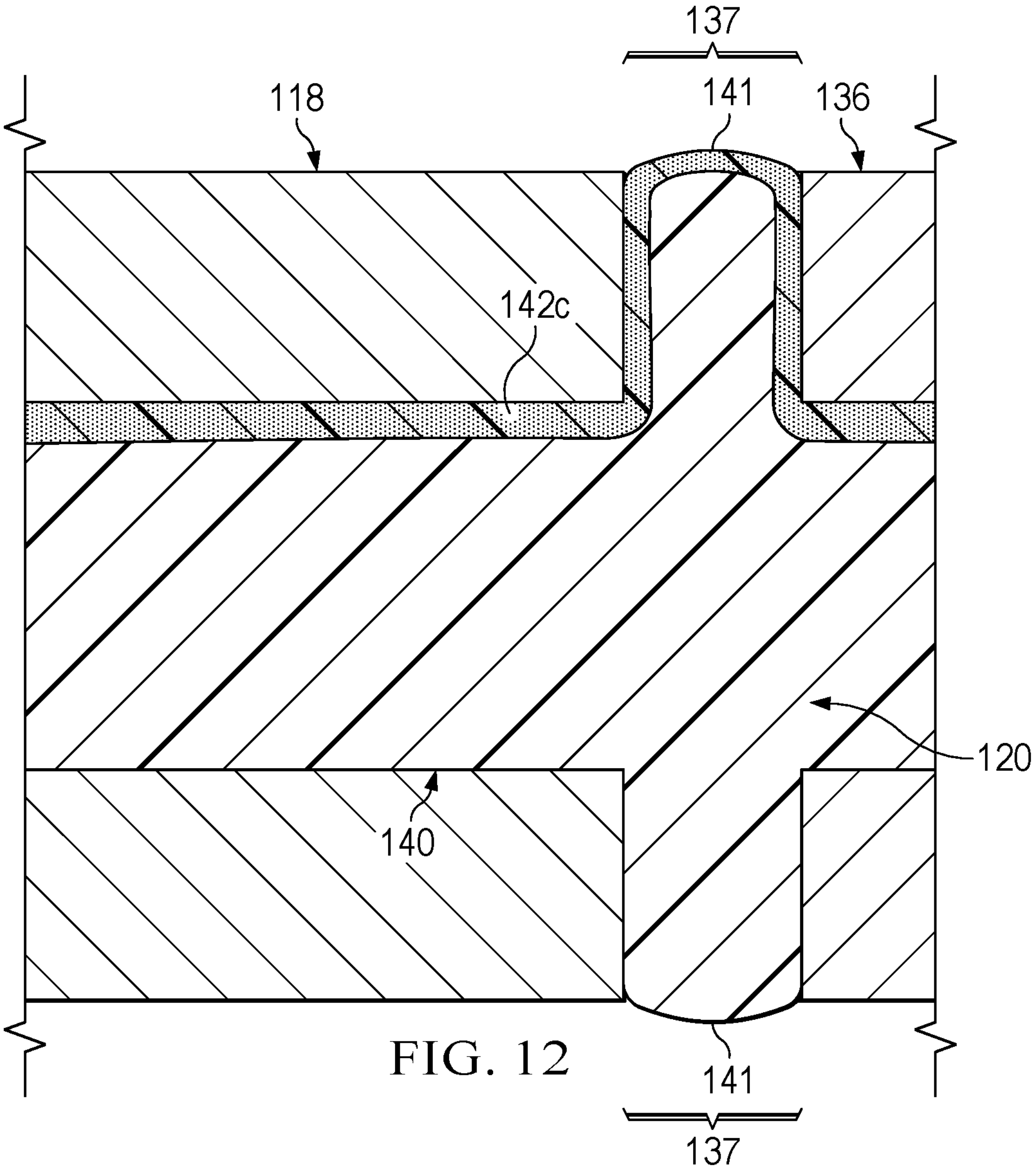
FIG. 12 is another operational view similar to FIG. 11, but the material is exiting from the basic die that includes the colorant.
Figure 13:
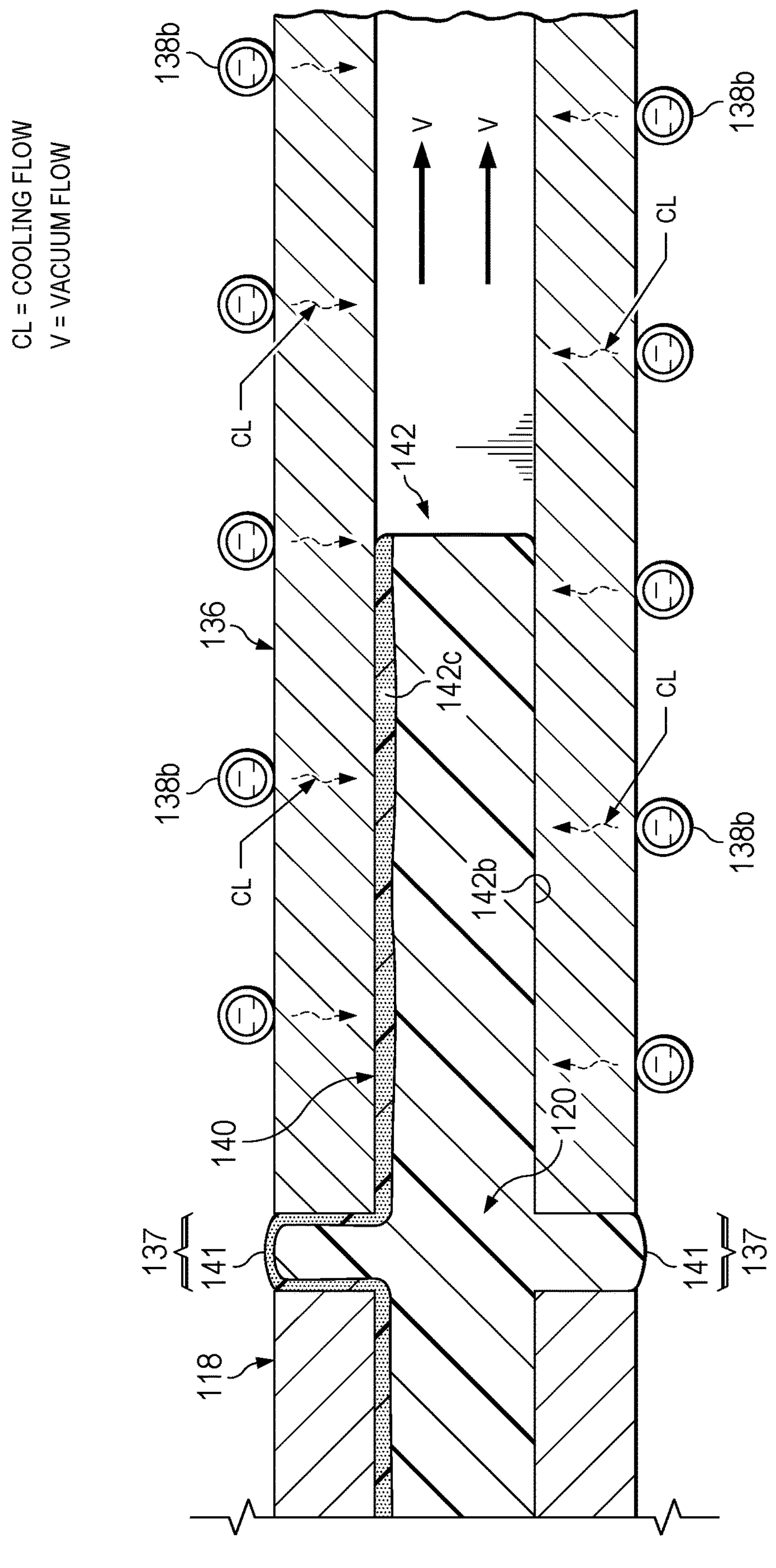
FIG. 13 is another operational view similar to FIG. 12, but the material is transferred from the basic die to a calibrator of the extrusion color injection system.

In this embodiment, an extrusion gap or space generally referred to as 137 is defined between the die 118 and the calibrator 136. As best seen in FIGS. 12-13, the extrusion gap 137 is defined between the second end 118*b* of the die 118 and the first end 136*a* of the calibrator 136. Such structural separation between the die 118 and the calibrator 136 is considered advantageous at least because that extruded material being ejected from the die 118 creates a bubble or enlarged mass inside of the extrusion gap 137 to create patterns and/or designs in material once the material is formed into a desired objected (e.g., a wood plank or wood board).

It should be understood that a distance of the extrusion gap 137 defined between the die 118 and the calibrator 136 may be any suitable value that allows the extruded material to create a bubble or enlarged mass inside of the extrusion gap 137 for design purposes. In one exemplary embodiment, the extrusion gap 137 measured between the second end 118*b* of the die 118 and the first end 136*a* of the calibrator 136 is between one-half of an inch to about one inch. In another exemplary embodiment, the extrusion gap 137 measured between the second end 118*b* of the die 118 and the first end 136*a* of the calibrator 136 is between three-quarters of an inch to about one inch. In another exemplary embodiment, the extrusion gap 137 measured between the second end 118*b* of the die 118 and the first end 136*a* of the calibrator 136 is approximately three-quarters of an inch.

Having thus described the elements and components of extrusion color injector system 110, the operation and use thereof will now be described in more detail.

Figure 11:
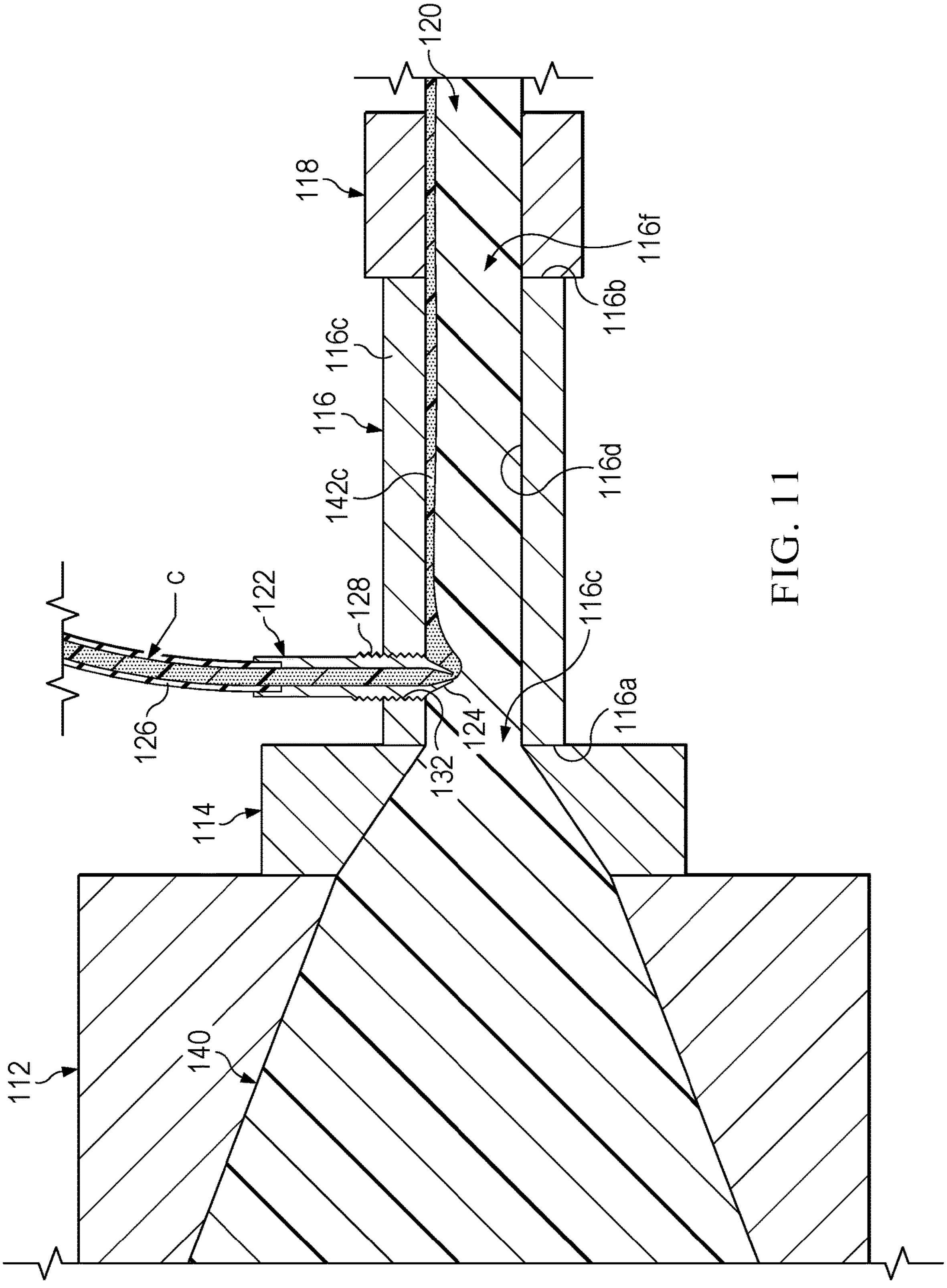
FIG. 11 is an operational view of the second embodiment, wherein material is being extruded from an extruder of the extrusion color injection system to a basic or first die of the extrusion color injection system for forming the material into an artificial wood board and is being injected with a colorant by at least one injector of the extrusion color injection system.

In operation, extruder 112 extrudes a material (labeled 140 in FIGS. 11-13) with a first color from the extruder exit 114 and into the feed throat 116 and the die 118 (see FIG. 11). As the material 140 is exerted through the die 118, the die 118 forms the material 140 into a desired shape and/or configuration based on the shapes and/or configurations of the die 118, the die entry 119, and the die exit 120. In the present disclosure, the die 118 is sized and configured to help form the material 140 into a board that intends to simulate a wood board having woodgrain, which is discussed in greater detail below.

As the material 140 is being formed into an artificial wood board, at least one injector 122 that is engaged with the feed throat 116 at a respective injection insert hole 132 injects one or more colorants or color concentrates (labeled "C" in FIG. 11) into the material 140 while said material 140 is still molten. It should be understood that the colorant is injected at a predetermined depth into the material 140 based on the vertical placement of the injector 122 inside of the feed throat 116 similar to the vertical placement of the injectors 22 inside of the injection block 30 as mentioned above. In one example, a first injector of the set of injectors 122 may be set a first depth measured relative to an outer surface of the feed throat 116, and a second injector of the set of injectors 122 may be set a second depth measured relative to the outer surface of the feed throat 116 wherein the second depth is different than the first depth of the first injector of the set of injectors 122. As mentioned previously, such varying of depths at which colorant is injected into the material is preferred when intending to further enhance or increase the visual dynamics of the end product (e.g., varying shades or intensities of artificial woodgrain injected into the material 140).

It should be understood that during operation, the injectors 122 may also deliver a predetermined amount of shade, type, or a combination thereof of colorant material into the molten flow at predetermined or semi-random intervals injecting the secondary color behind or after the mixing screw of the extruder 112 but before the solidification of the extruded board may provide an aesthetically pleasing woodgrain appearance with surface colors increasing visual dynamics of the end product polymer board. As mentioned above, the colorants can be any suitable colorant or color concentrate including a plastic capable of integrating with the base plastic forming the body of the polymer board. For example, LDPE, HDPE, and/or polycarbonate may be utilized to enhance the texture and visual dynamics of the woodgrain appearance of the end product board.

In this particular embodiment, adding the injectors 122 between extruder 112 and the die 118 may cause the colorant to be injected directly into a partially shaped board. The placement of color injectors 122 in the feed throat 116 ahead of die 118 may result in different colorant patterns, including more random curls, folds, or knots of color, as the material is manipulated into the board dimensions as it passes through the die(s) 118 before moving into the calibrator 136. Thus, while the colorant will be drawn out as the molten material 140 moves through die 118, the lines produced by the injections will be mostly non-linear and/or random along the length of the extruded boards.

Once the material 140 has been injected with colorant by one or more injectors 122, the material 140 may then be transferred to the calibrator 136. Prior to being transferred to the calibrator 136, may ride along the second end 118*b* of the die 118 once the material 140 is pressed outside of the feed throat 116 through the feed throat outlet 116*f* (see FIG. 12). At this stage of operation, the material 140 begins to balloon and/or expand inside of the extrusion gap 137 that is defined between the second end 118*b* of the die 118 and the first end 136*a* of the calibrator 136; such ballooning and/or expansion of the material 140 inside of the extrusion gap 137 may be referred to herein as an extrusion bubble generally labeled as 141 in FIGS. 12 and 13. Such extrusion bubble 141 of the material 140 may protrude and/or extend beyond imaginary first plane that is defined along the top end 118*e* of the die 118 and the outer wall 136*d* of the calibrator 136 (see FIG. 12). Similarly, extrusion bubble 141 of the material 140 may also protrude and/or extend beyond imaginary second plane that is defined along the bottom end 118*f* of the die 118 and the outer wall 136*d* of the calibrator 136 (see FIG. 12). In a preferred operation, the extrusion bubble 141 may slightly intersect with the imaginary first plane and the imaginary second plane due to a curvilinear and/or rounded profile when viewed from a side elevation or longitudinal sectional view (see FIGS. 12 and 13).

Such bubbling and/or expansion of the material 140 inside of the extrusion gap 137 is considered advantageous at least because such state forms and seals a pattern in the material 140. At this stage, the colorant that was injected into the material 140 may be further formed and sealed into the material 140 due to the expansion of said material 140; such expansion may assist in further defining grain-line features and/or appearances in the material to simulate the look and features of a wood board or wood plank. While not illustrated herein, a cover or shielding may be used at this stage to protect the molten material from encountering any elements or material that are floating in the environment that surrounds the die 118 and/or the calibrator 136.

As the extrusion bubble 141 forms inside of the extrusion gap 137, the extrusion bubble 141 then moves towards the calibrator 136 in which the extrusion bubble 141 contacts and the first end 136*a* of the calibrator 136. As best seen in FIG. 12, the extrusion bubble 141 rides along the first end 136*a* of the calibrator 136 and moves towards the calibrator entry 136*f*. Once the extrusion bubble 141 reaches the calibrator entry 136*f*, the extrusion bubble 141 breaches through the calibrator entry 136*f* and enters into the passageway 136*e* of the calibrator 136. As the material 140 enters into the passageway 136*e*, the material 140 may be also forced forwardly through the passageway 136*e* from the first end 136*a* to the second end 136*b* due to the vacuum force applied by vacuum system 139; such vacuuming force applied by the vacuum system 139 is denoted by arrows labeled "V" in FIGS. 12 and 13. As the material 140 passes through the calibrator 136 in the molten and/or liquid state, the material may also experience a cooling flow generated by the cooling system 138; such cooling flow generated by the cooling system 136 is denoted by arrows labeled "CL" in FIGS. 12 and 13. Upon experiencing this cooling flow, the material 140 hardens at an increased rate so as the material 140 passes through the calibrator 136.

As the material 140 passes through the calibrator 136, the calibrator 136 includes a desired calibrator type and configuration to properly calibrate the extrusion prior to cooling and further processing. According to one aspect, calibrator 136 is a board calibrator that forms the material 140 into a board configuration prior to the material 140 cooling and further processing. According to another aspect, calibrator 136 may be a disc calibrator, a sleeve calibrator, or any other suitable calibrator type as dictated by the desired implementation and use thereof.

Figure 14:
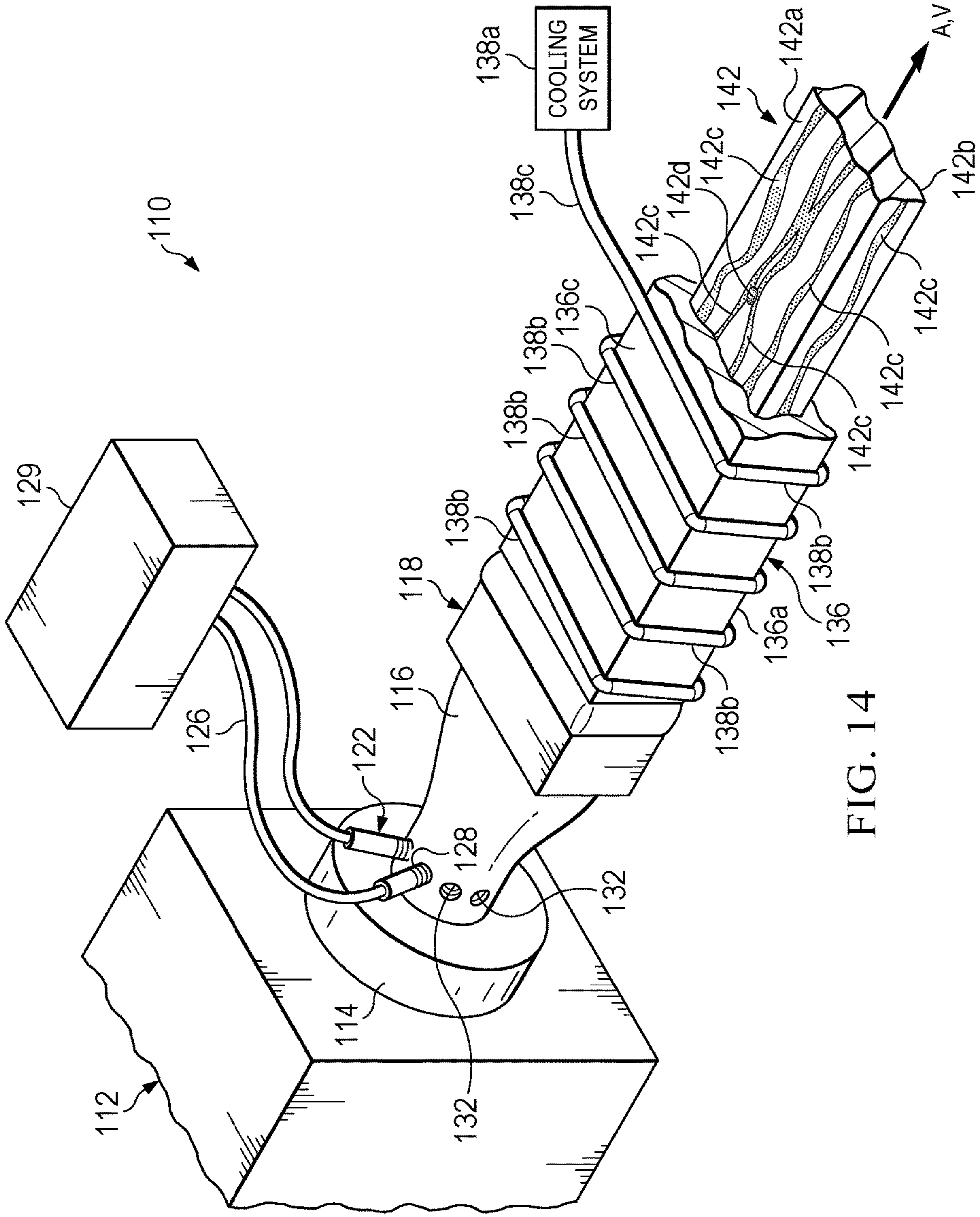
FIG. 14 is another operational view showing the material being formed into an artificial wood plank.

Upon completion of the extrusion process as discussed above and illustrated in FIGS. 11-13, material 140 is formed as an artificial wood board 142. As best seen in FIG. 14, the artificial wood board 142 includes a first extruded surface 142*a*, a second extruded surface 42*b* that is opposite to the first extruded surface 142*a*, and a plurality of artificial woodgrain elements 142*c* that are placed between the first extruded surface 142*a* and the second extruded surface 142*b* based on the depth at which one or more injectors 122 injected said colorant into the material 140. In one exemplary embodiment, each artificial woodgrain element of the plurality of artificial woodgrain elements 142*c* is placed at the same depth between the first extruded surface 142*a* and the second extruded surface 142*b*. In another exemplary embodiment, a first group of woodgrain elements of the plurality of woodgrain elements 142*c* is placed at a first depth between the first extruded surface 142*a* and the second extruded surface 142*b*, and a second group of woodgrain elements of the plurality of woodgrain elements 142*c* is placed at a second depth between the first extruded surface 142*a* and the second extruded surface 142*b* that is different from the first depth. In another exemplary embodiment, one or more artificial woodgrain knots 142*d* may also be defined in the artificial wood board 142 (see FIG. 14).

Figure 15:
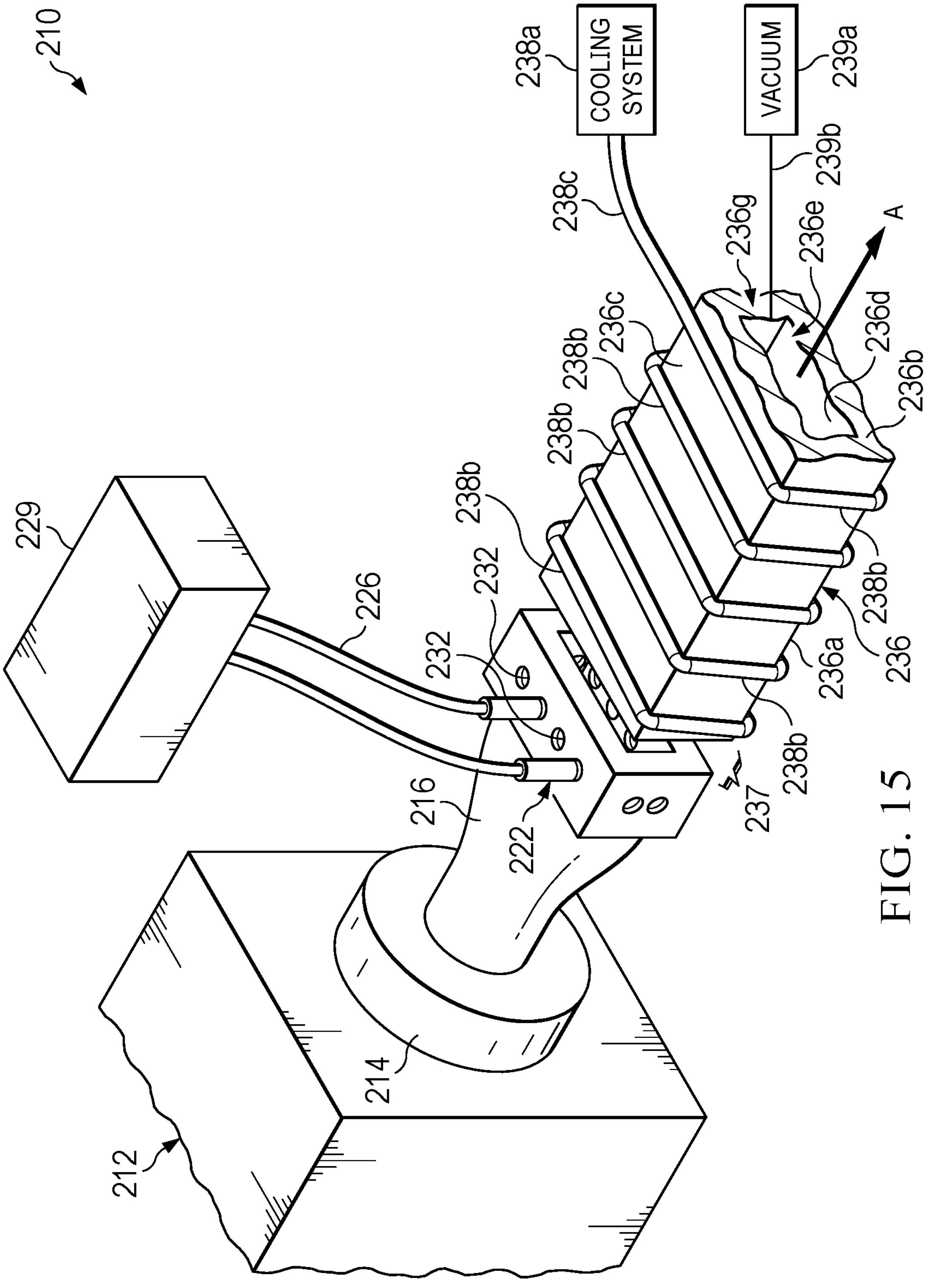
FIG. 15 is a side perspective view of a third embodiment of an extrusion color injection system in accordance to another aspect of the present disclosure.
Figure 16:
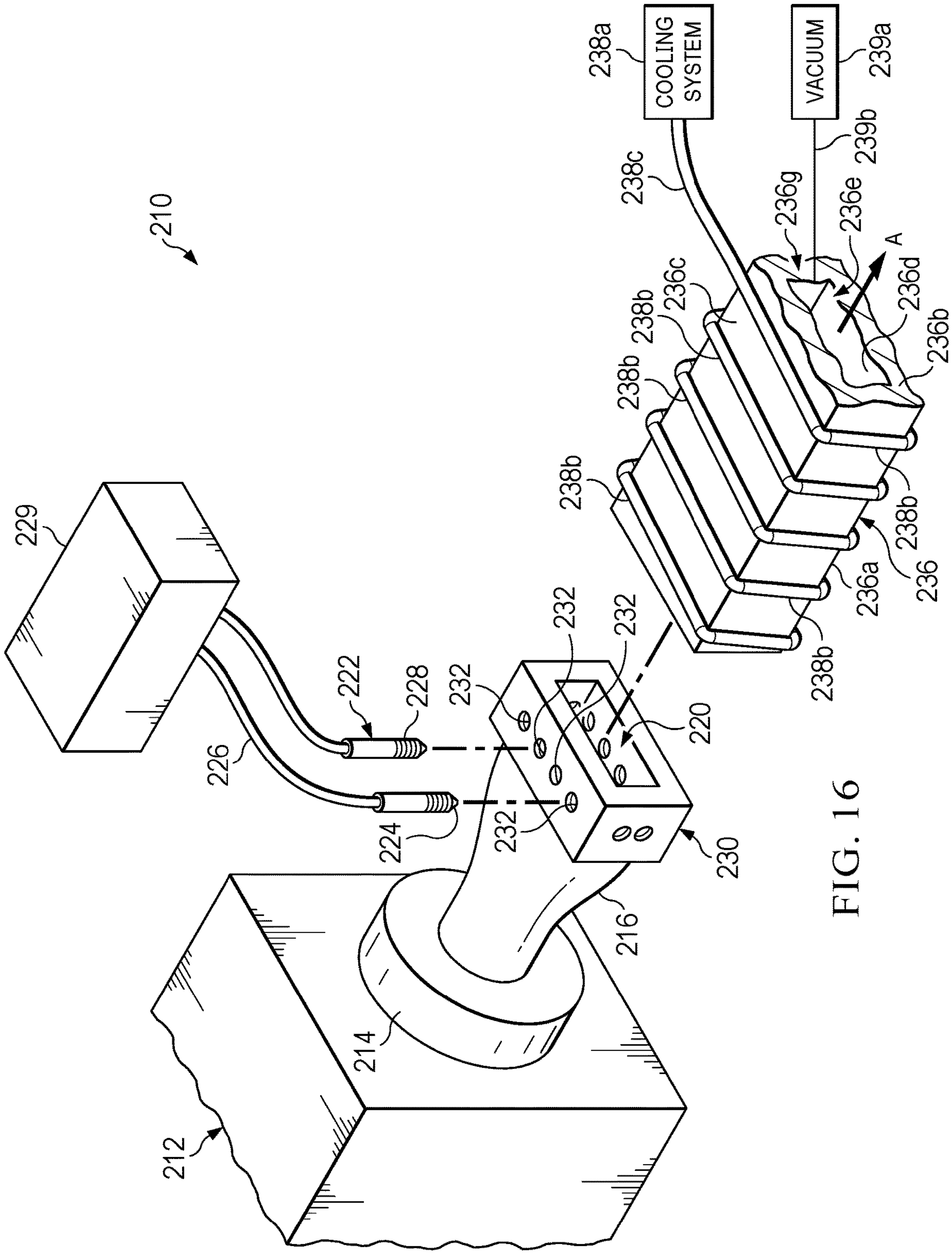
FIG. 16 is an exploded view of the third embodiment shown in FIG. 13.

FIGS. 15-16 illustrate another extrusion color injection system that is generally referenced as 210. The extrusion color injection system 210 is substantially similar to extrusion color injection system 10 discussed above and illustrated in FIGS. 1-7, except as detailed below.

With reference to FIG. 16, extrusion color injection system 210 includes extruder 212 having an extruder exit 214 that is substantially similar to the extruder 12 having the extruder exit 14 of the extrusion color injection system 10, a feed throat 216 downstream from the extruder 212 that is substantially similar to the feed throat 16 of the extrusion color injection system 10, and a calibrator 236 that is substantially similar to calibrator 36 of the extrusion color injection system 10. Extrusion color injection system 210 may further include one or more color injectors 222 having a nozzle or tip 224, injector feed 226 in operative communication with a hopper or color feeder 229, and an engagement portion 228 that are substantially similar to one or more color injectors 22 having nozzle or tip 24, injector feed 26 in operative communication with color feeder 29, and engagement portion 28 of the extrusion color injection system 10.

Extrusion color injection system 210 may further include a cooling system 238 that includes a cooling machine 238*a*, a set of cooling members 238*b*, and a cooling feed 238*c* that is substantially similar to cooling system 38 that includes cooling machine 38*a*, set of cooling members 38*b*, and cooling feed 38*c* of the extrusion color injection system 10. Extrusion color injection system 210 may further include a vacuum system 239 that includes a vacuum machine 239*a* and at least one vacuum line 239*b* that are substantially similar to vacuum system 39 that includes vacuum machine 39*a* and at least one vacuum line 39*b* of extrusion color injection system 10.

In this embodiment, extrusion color injection system 210 differs from extrusion color injection system 10. As best seen in FIG. 16, extrusion color injection system 210 includes one or more dies 218 having a die entry 219 and a die exit 220. The die 218 is downstream and in operative communication with the feed throat 216 for receiving and forming an extruded material. However, die 218 defines injector insert holes 232 that provide operative communication into a passageway (e.g., passageway 18*g*) defined in die 218. Similar to the injector insert holes 32 mentioned above, the injector insert holes 232 defined in the die 218 enables one or more injectors 222 to operably engage with the die 218 to deliver and inject colorant into material being extruded through the extrusion color injection system 210.

In operation, the implication of the injectors 222 being operably engaged with the die 218 is that the injectors 222 may inject a colorant or colorant material into the molten extrusion material as it passes through the die 218 prior to encountering calibrator 236, rather than injecting the colorant after the material exits the die 218 as with extrusion color injection system 10. As discussed in further detail below, injecting colorant material earlier in the process, by one or more injectors 222, may result in more random curls and folds in the colorant application resulting in a slightly more random and altered woodgrain pattern appearance, as discussed further below.

Extrusion color injection system 210 may also define an extrusion gap 237 defined between the die 218 and the calibrator 136 for expansion purposes of the material (as discussed above).

Figure 17:
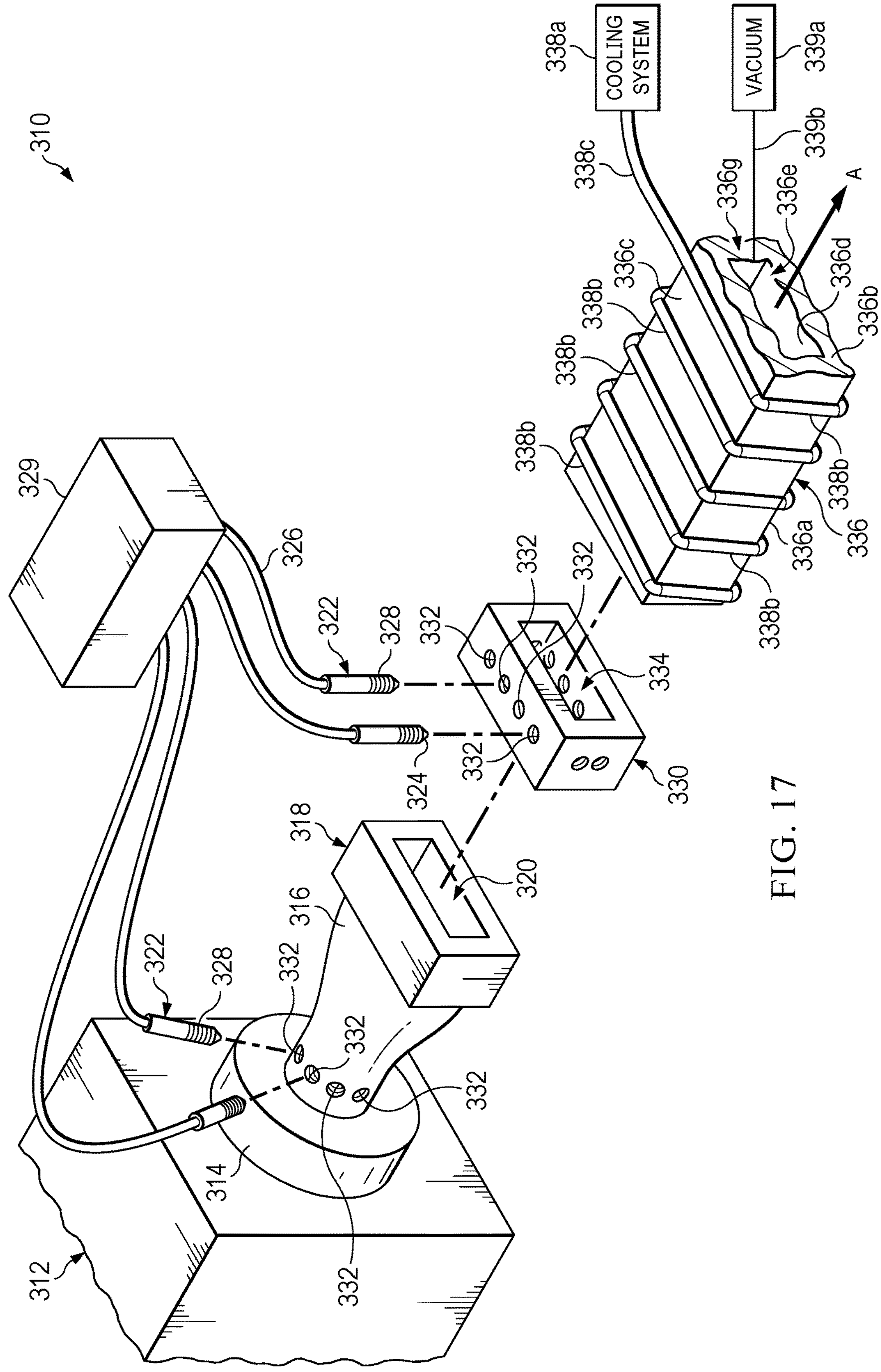
FIG. 17 is an exploded view of a fourth embodiment of an extrusion color injection system in accordance to another aspect of the present disclosure.

FIG. 17 illustrates another extrusion color injection system that is generally referenced as 310. The extrusion color injection system 310 is a combination of the extrusion color injection system 10 illustrated in FIGS. 1-7 and the extrusion color injection system 110 illustrated in FIGS. 9-13.

In this embodiment, extrusion color injection system 310 includes extruder 312 having an extruder exit 314 that is substantially similar to the extruders 12, 112 having the extruder exits 14, 114 of the extrusion color injection systems 10, 110, one or more dies 318 having a die entry 319 and a die exit 320 that are substantially similar to one or more dies 18, 118 having die entries 19, 119 and die exits 20, 120 of the extrusion color injection systems 10, 110, and calibrator 236 that are substantially similar to calibrators 36, 136 of the extrusion color injection systems 10, 110. Extrusion color injection system 310 further includes one or more color injectors 322 having a nozzle or tip 324, injector feed 326 in operative communication with a hopper or color feeder 329, and an engagement portion 328 that are substantially similar to one or more color injectors 22, 122 having nozzles or tips 24, 124, injector feeds 26, 126 in operative communication with color feeders 29, 129, and engagement portions 28, 128 of the extrusion color injection systems 10, 110.

In this embodiment, extrusion color injection system 310 includes a feed throat 316 that is substantially similar to feed throat 116 of the extrusion color injection system 110 and an injection block 330 that is substantially similar to the injection block 30 of the extrusion color injection system 10. Particularly, each of the feed throat 316 and the injection block 330 defines a set of injector insert holes 332 that provides operative communication into a passageway defined in feed throat 116 and a passageway (e.g., passageway 30*g*) defined in the injection block 330. Similar to the injector insert holes 32 mentioned above, the injector insert holes 332 defined in each of the feed throat 316 and the injection block 330 enables one or more injectors 322 to operably engage with the feed throat 316 and the injection block 330 to deliver and inject colorant into material being extruded through the extrusion color injection system 310.

In operation, the implication of the injectors 322 being operably engaged with the feed throat 316 and the injection block 330 is that the injectors 322 may inject a colorant or colorant material into the molten extrusion material as it passes through the feed throat 316 prior to encountering die 318 or after encountering die 318 based on the desired appearance and aesthetics of the material. With such configuration of the extrusion color injection system 310, operators may switch, manually or automatically, between using the injectors 322 engaged with the feed throat 316 or the injectors 322 engaged with the injection block 330. In one instance, an operator of the extrusion color injection system 310 may decide to use the injectors 322 engaged with the feed throat 316 by injecting colorant material earlier in the process to create more random curls and folds in the colorant application resulting in a slightly more random and altered woodgrain pattern appearance. In another instance, an operator of the extrusion color injection system 310 may decide to use the injectors 322 engaged with the injection block 330 by injecting colorant material later in the process to create more linear and/or straight grain in the colorant application resulting in a slightly less random and predictable woodgrain pattern appearance.

Alternatively, although not shown, another location for color injectors (e.g., injectors 22, 122, 222, 322, 422) may include placing color injectors in the last portion of the extruder 12, 112, 212 ahead of the extruder exit 14, 114, 214 which would further increase the random pattern produced by the injection of color at that point.

Each extrusion color injection system discussed herein (e.g., extrusion color injection systems 10, 110, 210, 310, 410) may be capable forming an artificial wood board or wood plank based on a photograph or scanned imaged of a desired wood board. As such, scanned images of a variety of wood boards or materials may be loaded into an extrusion color injection system so that one or more injectors of the extrusion color injection system may inject the desired amount of colorant into the material to artificially create the scanned wood board through an extrusion process. Such images may be loaded into a tangible readable medium that is accessible by a processor and/or actuator system of the extrusion color injection system to control and/or command the injection operations of one or more injectors of the extrusion color injection system.

Figure 18:
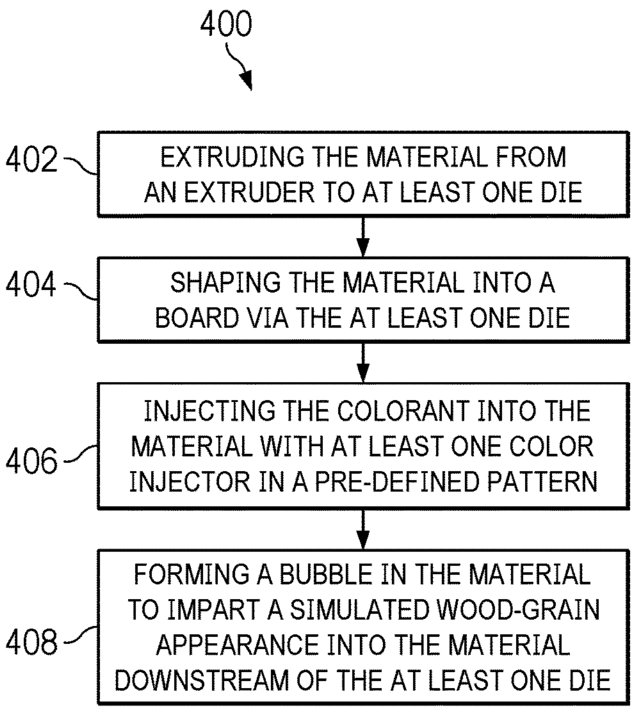
FIG. 18 is a flowchart depicting one exemplary method of injecting a colorant into an extruded material.

FIG. 18 illustrates a method 400 of injecting a colorant into an extruded material. An initial step 402 of method 400 includes extruding the material from an extruder to at least one die. Another step 404 of method 400 includes shaping the material into a board via the at least one die. Another step 406 of method 400 includes injecting the colorant into the material with at least one color injector in a pre-defined pattern. Another step 408 of method 400 includes forming a bubble in the material to impart a simulated woodgrain appearance into the material downstream of the at least one die.

In other exemplary embodiments, method 400 may include optional and/or further steps of injecting a colorant into an extruded material. In one exemplary embodiment, method 400 may further include steps of delivering the colorant to the at least one color injector via a continuous feed; and transferring the colorant from the at least one color injector into the material via a nozzle of the at least one color injector. In another exemplary embodiment, method 400 may further include that the step of injecting the colorant into the material further comprises: directing the material through an injection block downstream of the at least one die; and injecting the colorant into the material via the at least one color injector while the material passes through the injection block. In another exemplary embodiment, method 400 may further include steps of adjusting the at least one color injector to a first injection depth relative to the injection block; wherein the colorant is injected into the material at the first injection depth. In another exemplary embodiment, method 400 may further include steps of adjusting at least another color injector to a second injection depth relative to the injection block; wherein the colorant is injected into the material at the second injection depth that is different than the first injection depth of the colorant. In another exemplary embodiment, method 400 may further include that the step of shaping the material into the board further comprises: shaping the material into the board via the at least one die and the injector block. In another exemplary embodiment, method 400 may further include a step of directing the material into a calibrator downstream of the injection block. In another exemplary embodiment, method 400 may further include that the step of extruding the material from the extruder to the at least one die further comprises: directing the material from an exit of the extruder to the at least one die via a feed throat operably connected therebetween. In another exemplary embodiment, method 400 may further include that the step of injecting the colorant into the material further comprises: injecting the colorant into the material via the at least one color injector while the material passes through the feed throat. In another exemplary embodiment, method 400 may further steps of adjusting the at least one color injector to a first injection height relative to the feed throat; wherein the colorant is injected into the material at the first injection height. In another exemplary embodiment, method 400 may further include a step of adjusting at least another color injector to a second injection height relative to the feed throat; wherein the colorant is injected into the material at the second injection height that is different than the first injection height of the colorant. In another exemplary embodiment, method 400 may further include a step of directing the material into a calibrator downstream of the at least one die. In another exemplary embodiment, method 400 may further include that the step of injecting the colorant into the material further comprises: injecting the colorant into the material via the at least one color injector while the material passes through a feed throat; and injecting a second colorant into the material via at least another color injector while the material passes through an injection block. In another exemplary embodiment, method 400 may further include steps of adjusting the at least one color injector to a first injection height relative to the feed throat, wherein the colorant is injected into the material at the first injection height; and adjusting the at least another color injector to a second injection height relative to the injection block; wherein the second colorant is injected into the material at the second injection height that is different than the first injection height of the colorant. In another exemplary embodiment, method 400 may further include steps of directing the material into an extrusion gap defined between the injection block and a calibrator; forming the bubble of the material in the extrusion gap; and directing the material into the calibrator downstream of the injection block and the extrusion gap. In another exemplary embodiment, method 400 may further include steps of directing the material into an extrusion gap defined between the at least one die and the calibrator; forming the bubble of the material in the extrusion gap; and directing the material into the calibrator downstream of the at least one die and the extrusion gap.

Figure 19:
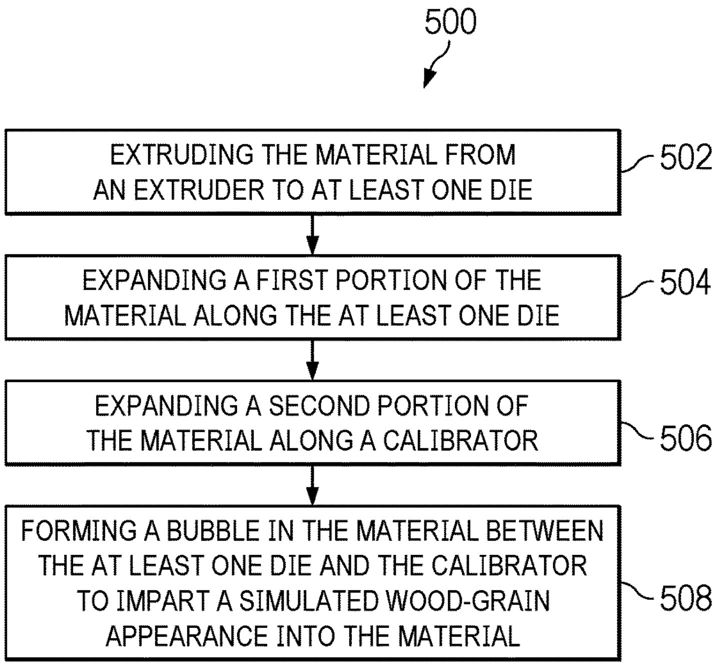
FIG. 19 is a flowchart depicting another exemplary method of forming an extrusion bubble in an extruded material.

FIG. 19 illustrates another method 500 of forming an extrusion bubble in an extruded material. An initial step 502 of method 500 includes extruding the material from an extruder to at least one die. Another step 504 of method 500 includes expanding a first portion of the material along the at least one die. Another step 506 of method 500 includes expanding a second portion of the material along a calibrator. Another step 508 of method 500 includes forming a bubble in the material between the at least one die and the calibrator to impart a simulated woodgrain appearance into the material.

In other exemplary embodiments, method 500 may include optional and/or further steps of forming an extrusion bubble in an extruded material. In one exemplary embodiment, method 500 may include steps of defining an extrusion gap between the at least one die and the calibrator; wherein the bubble is formed inside of the extrusion gap. In another exemplary embodiment, method 500 may include that the extrusion gap is less than one inch when measured between the at least one die and the calibrator. In another exemplary embodiment, method 500 may include a step of expanding the bubble of the material along an exit end of the at least one die and into the extrusion gap. In another exemplary embodiment, method 500 may include a step of expanding the bubble of the material along an entry end of the calibrator and into the calibrator. In another exemplary embodiment, method 500 may include steps of providing a top end of the at least one die that is above the exit end of the at least one die; providing an exterior wall of the calibrator of the calibrator that is spaced apart from the entry end of the calibrator; defining an imaginary first plane that is parallel with the top end of the at least one die and the exterior wall of the entry end; and intersecting the imaginary first plane by the bubble of the material. In another exemplary embodiment, method 500 may include steps of providing a bottom end of the at least one die that is below the exit end of the at least one die and opposite to the top end of the at least one die; defining an imaginary second plane that is parallel with the bottom end of the at least one die and the exterior wall of the entry end; and intersecting the imaginary second plane by the bubble of the material.

Figure 20:
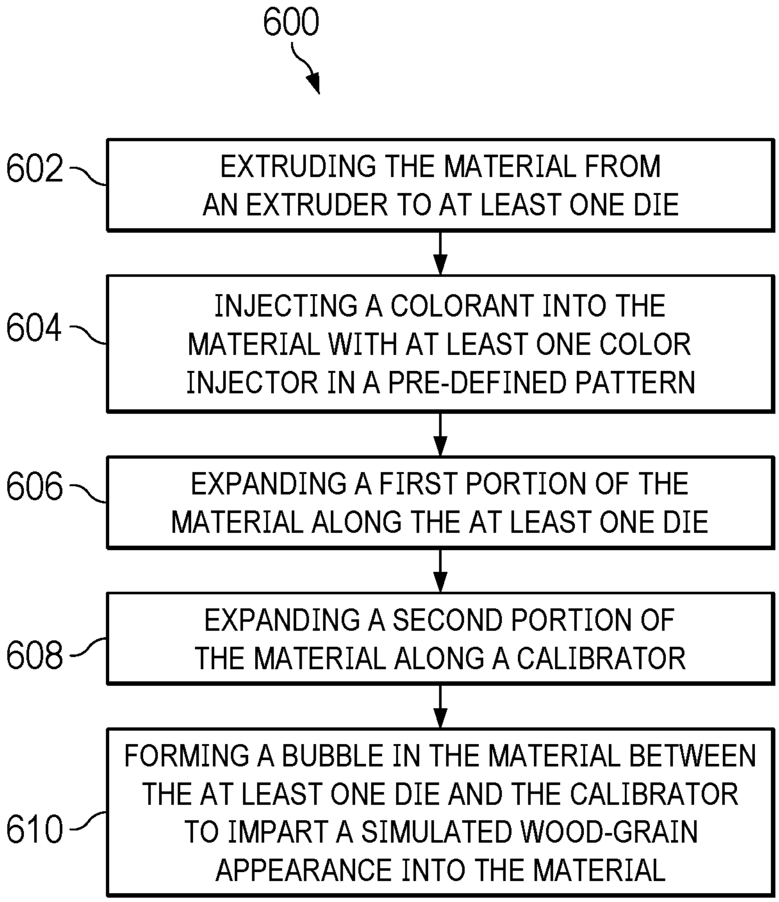
FIG. 20 is a flowchart depicting another exemplary method of forming an extrusion bubble in an extruded material.

FIG. 20 illustrates another method 600 of forming an extrusion bubble in an extruded material. An initial step 602 of method 600 includes extruding the material from an extruder to at least one die. Another step 604 of method 600 includes injecting a colorant into the material with at least one color injector in a pre-defined pattern. Another step 606 of method 600 includes expanding a first portion of the material along the at least one die. Another step 608 of method 600 includes expanding a second portion of the material along a calibrator. Another step 610 of method 600 includes forming a bubble in the material between the at least one die and the calibrator to impart a simulated woodgrain appearance into the material.

In other exemplary embodiments, method 600 may include optional and/or further steps of forming an extrusion bubble in an extruded material. In one exemplary embodiment, method 600 may further include a step of defining an extrusion gap between the at least one die and the calibrator; wherein the bubble is formed inside of the extrusion gap. In another exemplary embodiment, method 600 may further include that the extrusion gap is less than one inch when measured between the at least one die and the calibrator. In another exemplary embodiment, method 600 may further include a step of expanding the bubble of the material along an exit end of the at least one die and into the extrusion gap. In another exemplary embodiment, method 600 may further include a step of expanding the bubble of the material along an entry end of the calibrator and into the calibrator. In another exemplary embodiment, method 600 may further include steps of providing a top end of the at least one die that is above the exit end of the at least one die; providing an exterior wall of the calibrator of the calibrator that is spaced apart from the entry end of the calibrator; defining an imaginary first plane that is parallel with the top end of the at least one die and the exterior wall of the entry end; and intersecting the imaginary first plane by the bubble of the material. In another exemplary embodiment, method 600 may further include steps of providing a bottom end of the at least one die that is below the exit end of the at least one die and opposite to the top end of the at least one die; defining an imaginary second plane that is parallel with the bottom end of the at least one die and the exterior wall of the entry end; and intersecting the imaginary second plane by the bubble of the material. In another exemplary embodiment, method 600 may further include that the step of injecting the colorant into the material with the at least one color injector in the pre-defined pattern further comprises: connecting the at least one color injector with an injection block. In another exemplary embodiment, method 600 may further include steps of providing the injection block downstream of the at least one die; and providing the injection block upstream of the calibrator. In another exemplary embodiment, method 600 may further include a step of defining an extrusion gap between the injection block and the calibrator; wherein the bubble is formed inside of the extrusion gap defined between the injection block and the calibrator. In another exemplary embodiment, method 600 may further include a step of expanding the bubble of the material along an exit end of the injection block and into the extrusion gap. In another exemplary embodiment, method 600 may further include a step of expanding the bubble of the material along an entry end of the calibrator and into the calibrator. In another exemplary embodiment, method 600 may further include steps of providing a top end of the injection block that is above the exit end of the injection block; providing a bottom end of the injection block that is below the exit end of the injection block and opposite to the top end of the injection block; providing an exterior wall of the calibrator of the calibrator that is spaced apart from the entry end of the calibrator; defining an imaginary first plane that is parallel with the top end of the injection block and the exterior wall of the entry end; defining an imaginary second plane that is parallel with the bottom end of the injection block and the exterior wall of the entry end; and intersecting one or both of the imaginary first plane and the imaginary second plane by the bubble of the material.

The device, assembly, or system of the present disclosure may additionally include one or more sensors to sense or gather data pertaining to the surrounding environment or operation of the device, assembly, or system. Some exemplary sensors capable of being electronically coupled with the device, assembly, or system of the present disclosure (either directly connected to the device, assembly, or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A method of forming an extrusion bubble in an extruded material, comprising:

extruding the material from an extruder to at least one die;

feeding a first portion of the material along the at least one die;

feeding a second portion of the material along a calibrator, the second portion of the material being introduced to the calibrator via an injection block, the injection block having at least two adjustable injectors associated therewith, the at least two adjustable injectors being configured to introduce continuously and simultaneously a respective amount of the second portion of the material via the injection block, each respective adjustable injector being configured to feed the respective amount of the second portion of the material via at least one of a gravity feed or a pressurized feed, an injection height of a respective injector being adjustable relative to the injection block, each respective injector being configured to vary the depth at which the second portion of the material is fed into the first portion of the material; and forming a bubble in the material between the at least one die and the calibrator to impart a simulated woodgrain appearance into the material.

2. The method of claim 1, further comprising:

defining an extrusion gap between the at least one die and the calibrator;

wherein the bubble is formed inside of the extrusion gap.

3. The method of claim 2, wherein the extrusion gap is less than one inch when measured between the at least one die and the calibrator.

4. The method of claim 2, further comprising:

expanding the bubble of the material along an exit end of the injection block and into the extrusion gap.

5. The method of claim 4, further comprising:

expanding the bubble of the material along an entry end of the calibrator and into the calibrator.

6. The method of claim 5, further comprising:

providing a top end of the at least one die that is above the exit end of the at least one die;

providing an exterior wall of the calibrator of the calibrator that is spaced apart from the entry end of the calibrator;

defining an imaginary first plane that is parallel with the top end of the at least one die and the exterior wall of the entry end; and intersecting the imaginary first plane by the bubble of the material.

7. The method of claim 6, further comprising:

providing a bottom end of the at least one die that is below the exit end of the at least one die and opposite to the top end of the at least one die;

defining an imaginary second plane that is parallel with the bottom end of the at least one die and the exterior wall of the entry end; and intersecting the imaginary second plane by the bubble of the material.

8. A method of forming an extrusion bubble in an extruded material, comprising:

extruding a first portion of the material from an extruder to at least one die;

injecting a second portion of the material in a form of a colorant into the first portion of the material with at least two color injectors in a pre-defined pattern, the second portion of the material being injected and thereby fed into a calibrator, the at least two color injectors carried by an injection block, the at least two color injectors being configured to introduce continuously and simultaneously a respective amount of the second portion of the material via the injection block, each respective color injector being configured to feed the respective amount of the second portion of the material via at least one of a gravity feed or a pressurized feed, an injection height of a respective color injector being adjustable relative to the injection block via a threaded engagement therebetween, each respective color injector being configured to vary the depth at which the second portion of the material is fed into the first portion of the material;

feeding a first portion of the material along the at least one die;

feeding the second portion of the material along the calibrator; and forming a bubble in the material between the at least one die and the calibrator to impart a simulated woodgrain appearance into the material.

9. The method of claim 8, further comprising:

defining an extrusion gap between the at least one die and the calibrator;

wherein the bubble is formed inside of the extrusion gap.

10. The method of claim 9, wherein the extrusion gap is less than one inch when measured between the at least one die and the calibrator.

11. The method of claim 9, further comprising:

expanding the bubble of the material along an exit end of the injection block and into the extrusion gap.

12. The method of claim 11, further comprising:

expanding the bubble of the material along an entry end of the calibrator and into the calibrator.

13. The method of claim 12, further comprising:

providing a top end of the at least one die that is above the exit end of the at least one die;

providing an exterior wall of the calibrator of the calibrator that is spaced apart from the entry end of the calibrator;

defining an imaginary first plane that is parallel with the top end of the at least one die and the exterior wall of the entry end; and intersecting the imaginary first plane by the bubble of the material.

14. The method of claim 13, further comprising:

providing a bottom end of the at least one die that is below the exit end of the at least one die and opposite to the top end of the at least one die;

defining an imaginary second plane that is parallel with the bottom end of the at least one die and the exterior wall of the entry end; and intersecting the imaginary second plane by the bubble of the material.

15. The method of claim 8, further comprising:

providing the injection block downstream of the at least one die; and providing the injection block upstream of the calibrator.

16. The method of claim 8, further comprising:

defining an extrusion gap between the injection block and the calibrator;

wherein the bubble is formed inside of the extrusion gap defined between the injection block and the calibrator.

17. The method of claim 16, further comprising:

expanding the bubble of the material along an exit end of the injection block and into the extrusion gap.

18. The method of claim 17, further comprising:

expanding the bubble of the material along an entry end of the calibrator and into the calibrator.

19. The method of claim 18, further comprising:

providing a top end of the injection block that is above the exit end of the injection block;

providing a bottom end of the injection block that is below the exit end of the injection block and opposite to the top end of the injection block;

providing an exterior wall of the calibrator of the calibrator that is spaced apart from the entry end of the calibrator;

defining an imaginary first plane that is parallel with the top end of the injection block and the exterior wall of the entry end;

defining an imaginary second plane that is parallel with the bottom end of the injection block and the exterior wall of the entry end; and intersecting one or both of the imaginary first plane and the imaginary second plane by the bubble of the material.

20. A method of forming an extrusion bubble in an extruded material, comprising:

extruding the material from an extruder to at least one die;

feeding a first portion of the material along the at least one die;

feeding a second portion of the material along a calibrator with at least two injectors, the at least two injectors carried by an injection block, the at least two injectors being configured to introduce continuously and simultaneously a respective amount of the second portion of the material via the injection block, each respective injector being configured to feed the respective amount of the second portion of the material via at least one of a gravity feed or a pressurized feed, an injection height of a respective injector being adjustable relative to the injection block, each respective injector being configured to vary the depth at which the second portion of the material is fed into the first portion of the material; and forming a bubble in the material between the at least one die and the calibrator to impart a simulated woodgrain appearance into the material, the second portion of the material being introduced after the first portion is fed along the at least one die and before forming the bubble between the at least one die and the calibrator.

* * * * *